United States Patent
Ohsugi et al.

(10) Patent No.: US 10,049,574 B2
(45) Date of Patent: Aug. 14, 2018

(54) TRANSPORTER VEHICLE, DUMP TRUCK, AND TRANSPORTER VEHICLE CONTROL METHOD

(71) Applicant: Komatsu Ltd., Tokyo (JP)

(72) Inventors: Shigeru Ohsugi, Hiratsuka (JP); Shinji Mitsuta, Hiratsuka (JP); Hiroyuki Watanabe, Hitachinaka (JP); Hirofumi Minato, Hiratsuka (JP); Tetsuya Fujita, Chigasaki (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/435,836

(22) PCT Filed: Sep. 1, 2014

(86) PCT No.: PCT/JP2014/072942
§ 371 (c)(1),
(2) Date: Apr. 15, 2015

(87) PCT Pub. No.: WO2015/030240
PCT Pub. Date: Mar. 5, 2015

(65) Prior Publication Data
US 2016/0063864 A1    Mar. 3, 2016

(51) Int. Cl.
*G08G 1/16* (2006.01)
*B60W 30/09* (2012.01)
(Continued)

(52) U.S. Cl.
CPC ............... *G08G 1/16* (2013.01); *B60P 1/286* (2013.01); *B60W 10/18* (2013.01);
(Continued)

(58) Field of Classification Search
None
See application file for complete search history.

(56) References Cited

U.S. PATENT DOCUMENTS

| | | | |
|---|---|---|---|
| 5,714,928 A * | 2/1998 | Sudo | B60T 7/22 340/435 |
| 6,894,608 B1 * | 5/2005 | Gunderson | B60Q 1/525 340/425.5 |

(Continued)

FOREIGN PATENT DOCUMENTS

| CN | 101678819 A | 3/2010 |
|---|---|---|
| CN | 103903443 A | 7/2014 |

(Continued)

OTHER PUBLICATIONS

International Search Report dated Dec. 9, 2014, issued for PCT/JP2014/072942.

(Continued)

*Primary Examiner* — John Olszewski
*Assistant Examiner* — Navid Ziaeianmehdizadeh
(74) *Attorney, Agent, or Firm* — Locke Lord LLP

(57) ABSTRACT

Provided is a transporter vehicle including: a vehicle; an object detection device that detects an object at a front side of the vehicle; a collision determination unit that determines a possibility of a collision with the object based on a detection result of the object detection device; a process system that performs a process for reducing damage caused by the collision; a control unit that outputs a signal for reducing the damage caused by the collision to the process system based on a determination result of the collision determination unit; a time point data acquisition unit that acquires time point data in which the signal is output from the control unit; and an output unit that outputs process history data indicating at least a state of the process system. The output unit outputs the time point data and the process history data in association with each other.

21 Claims, 11 Drawing Sheets

(51) Int. Cl.
*B60P 1/28* (2006.01)
*B60W 30/085* (2012.01)
*B60W 10/18* (2012.01)
*B60W 50/14* (2012.01)

(52) U.S. Cl.
CPC .......... *B60W 30/085* (2013.01); *B60W 30/09* (2013.01); *B60W 50/14* (2013.01); *B60W 2050/143* (2013.01); *B60W 2300/12* (2013.01); *B60W 2530/10* (2013.01); *B60W 2550/10* (2013.01); *B60W 2710/18* (2013.01); *B60W 2750/40* (2013.01)

(56) References Cited

U.S. PATENT DOCUMENTS

| | | | | |
|---|---|---|---|---|
| 6,933,837 | B2* | 8/2005 | Gunderson | B60R 21/013 180/167 |
| 7,124,027 | B1* | 10/2006 | Ernst, Jr. | B60W 30/09 340/435 |
| 7,132,933 | B2* | 11/2006 | Nakai | G06K 9/00651 340/435 |
| 7,778,753 | B2* | 8/2010 | Fujiwara | B60T 8/17558 340/435 |
| 8,798,885 | B2 | 8/2014 | Tsuchida | |
| 2003/0083818 | A1* | 5/2003 | Tojima | G01S 13/426 701/301 |
| 2004/0193347 | A1* | 9/2004 | Harumoto | B60T 8/1755 701/45 |
| 2005/0167164 | A1* | 8/2005 | Takeda | B60G 5/00 177/136 |
| 2006/0106538 | A1* | 5/2006 | Browne | B60R 21/01 701/301 |
| 2007/0288133 | A1* | 12/2007 | Nishira | G05D 1/0214 701/23 |
| 2008/0186206 | A1* | 8/2008 | Reumerman | G08G 1/161 340/902 |
| 2008/0189040 | A1* | 8/2008 | Nasu | G08G 1/163 701/301 |
| 2010/0106356 | A1* | 4/2010 | Trepagnier | G01S 17/023 701/25 |
| 2010/0106387 | A1* | 4/2010 | Tsuchida | B60R 21/0134 701/70 |
| 2013/0218604 | A1* | 8/2013 | Hagelstein | G06Q 40/08 705/4 |
| 2013/0293395 | A1* | 11/2013 | Ohama | G08G 1/16 340/904 |
| 2014/0180568 | A1* | 6/2014 | Nagata | B60T 7/22 701/301 |
| 2014/0266859 | A1* | 9/2014 | Kurihara | G01S 13/86 342/70 |
| 2014/0361882 | A1* | 12/2014 | Akiyama | G08G 1/16 340/435 |
| 2014/0375503 | A1* | 12/2014 | Kurihara | G01S 13/86 342/385 |
| 2015/0161892 | A1* | 6/2015 | Oremus | G08G 1/165 340/901 |
| 2015/0298621 | A1* | 10/2015 | Katoh | B60R 11/04 348/148 |
| 2016/0063332 | A1* | 3/2016 | Sisbot | B60R 1/00 382/104 |

FOREIGN PATENT DOCUMENTS

| | | |
|---|---|---|
| JP | 2003-329465 A | 11/2003 |
| JP | 2004-185179 A | 7/2004 |
| JP | 2007-102658 A | 4/2007 |
| JP | 2009-096403 A | 5/2009 |
| JP | 2009-099062 A | 5/2009 |
| JP | 2013-249002 A | 12/2013 |

OTHER PUBLICATIONS

Office Action dated Feb. 23, 2016, issued for the corresponding Canadian patent application No. 2,888,228.

* cited by examiner

| GENERATION TIME POINT (GENERATION TIME POINT DATA) | COLLISION POSSIBILITY LEVEL (COLLISION POSSIBILITY LEVEL DATA) | PROCESS CONTENT (PROCESS HISTORY DATA) |
|---|---|---|
| ○ MONTH ○ DAY ○○ TIME ○○ MINUTE ×× SECOND | LEVEL 2 | ALARM |
| ○ MONTH ○ DAY △△ TIME △△ MINUTE △△ SECOND | LEVEL 1 | FULL BRAKE |
| ⋮ | ⋮ | ⋮ |

FIG.16

| GENERATION TIME POINT (GENERATION TIME POINT DATA) | POSITION (POSITION DATA) | VEHICLE (VEHICLE IDENTIFICATION DATA) | DRIVER (DRIVER IDENTIFICATION DATA) | TRAVELING SPEED (TRAVELING STATE DATA) | LOAD (LOADED STATE DATA) | COLLISION POSSIBILITY LEVEL (COLLISION POSSIBILITY LEVEL DATA) | PROCESS CONTENT (PROCESS HISTORY DATA) |
|---|---|---|---|---|---|---|---|
| △ MONTH △ DAY ×× TIME ○○ MINUTE ○○ SECOND | CURVE A | DUMP TRUCK C | DRIVER E | ×× km/h | EXISTENCE | LEVEL 2 | WEAK BRAKE |
| △ MONTH △ DAY ×× TIME ×× MINUTE ×× SECOND | INTERSECTION POINT B | DUMP TRUCK D | DRIVER F | △△ km/h | EXISTENCE | LEVEL 1 | FULL BRAKE |
| ... | ... | ... | ... | ... | ... | ... | ... |

TRANSPORTER VEHICLE, DUMP TRUCK, AND TRANSPORTER VEHICLE CONTROL METHOD

FIELD

The present invention relates to a transporter vehicle, a dump truck, and a transporter vehicle control method.

BACKGROUND

In a technical field involved with a transporter vehicle, there is known a technique in which data indicating a state of a transporter vehicle is output from the transporter vehicle. Patent Document 1 discloses a technique of transmitting lane departure data of a transporter vehicle to a server.

CITATION LIST

Patent Literature

Patent Literature 1: Japanese Unexamined Patent Application Publication No. 2009-099062

SUMMARY

Technical Problem

As transporter vehicles, there are known a general dump truck that travels in a general public road and a large-sized dump truck (an off-highway truck) that travels in a mining site of a mine. When the transporter vehicle collides with an object in the traveling state in the mining site of the mine, the transporter vehicle is damaged, and hence the operation of transporting crushed stone or the like is disturbed. As a result, there is a possibility that the productivity of the mining site may be degraded. Thus, it is important to prepare a prevention measure or an improvement plan so that the collision between the transporter vehicle and the object does not occur. For that reason, there is a need to check the state of the mining site by determining the possibility of the collision between the transporter vehicle and the object.

An aspect of the invention is to provide a transporter vehicle, a dump truck, and a transporter vehicle control method capable of recognizing a state having the possibility of a collision between a transporter vehicle and an object.

Solution to Problem

According to a first aspect of the invention, there is provided a transporter vehicle comprising: a vehicle; an object detection device that detects an object at a front side of the vehicle; a collision determination unit that determines a possibility of a collision with the object based on a detection result of the object detection device; a process system that performs a process for reducing damage caused by the collision; a control unit that outputs a signal for reducing the damage caused by the collision to the process system based on a determination result of the collision determination unit; a time point data acquisition unit that acquires time point data in which the signal is output from the control unit; and an output unit that outputs process history data indicating at least a state of the process system, wherein the output unit outputs the time point data and the process history data in association with each other.

According to a second aspect of the invention, there is provided a transporter vehicle comprising: a vehicle; an object detection device that detects an object at a front side of the vehicle; a collision determination unit that determines a possibility of a collision with the object based on a detection result of the object detection device; a process system that performs a process for reducing damage caused by the collision; a control unit that outputs a signal for reducing the damage caused by the collision to the process system based on a determination result of the collision determination unit; a position data acquisition unit that acquires position data of the vehicle outputting the signal from the control unit; and an output unit that outputs process history data indicating at least a state of the process system, wherein the output unit outputs the time point data and the process history data in association with each other.

According to a third aspect of the invention, there is provided a dump truck comprising: a vehicle; a vessel that is provided in the vehicle; an object detection device that detects an object at a front side of the vehicle; a collision determination unit that determines a possibility of a collision with the object based on a detection result of the object detection device; a process system that performs a process for reducing damage caused by the collision; a control unit that outputs a signal for reducing the damage caused by the collision to the process system based on a determination result of the collision determination unit; a time point data acquisition unit that acquires time point data in which the signal is output from the control unit; and an output unit that outputs process history data indicating at least a state of the process system, wherein the process history data indicates any one of an existence of the process and content of the process or both the existence of the process and the content of the process, wherein the output unit outputs the time point data and the process history data in association with each other, wherein the process system includes a plurality of process devices capable of performing different processes, wherein the control unit outputs the signal to the specific process device based on the determination result of the collision determination unit, wherein the output unit includes a communication unit used for wireless communication of the process history data, and wherein at least the process history data is output to the external device.

According to a fourth aspect of the invention, there is provided a dump truck comprising: a vehicle; a vessel that is provided in the vehicle; an object detection device that detects an object at a front side of the vehicle; a collision determination unit that determines a possibility of a collision with the object based on a detection result of the object detection device; a process system that performs a process for reducing damage caused by the collision; a control unit that outputs a signal for reducing the damage caused by the collision to the process system based on a determination result of the collision determination unit; a position data acquisition unit that acquires position data of the vehicle outputting the signal from the control unit; and an output unit that outputs process history data indicating at least a process state of the process system, wherein the process history data indicates any one of an existence of the process, content of the process, and both the existence of the process and the content of the process, wherein the output unit outputs the time point data and the process history data in association with each other, wherein the process system includes a plurality of process devices capable of performing different processes, wherein the control unit outputs the signal to the specific process device based on the determination result of the collision determination unit, wherein the output unit includes a communication unit used for wireless communication of the process history data, and wherein at least the process history data is output to an external device.

According to a fifth aspect of the invention, there is provided a transporter vehicle control method comprising: detecting an object at a front side of a transporter vehicle with a vessel by an object detection device provided in the transporter vehicle; determining a possibility of a collision between the transporter vehicle and the object based on a detection result of the object detection device; outputting a signal for reducing damage caused by the collision to a process system capable of performing a process for reducing the damage caused by the collision based on a determination result of the collision determination unit; and outputting process history data indicating at least a process state of the process system, wherein the outputting includes outputting time point data in which the signal is output from the control unit and the process history data in association with each other.

According to a sixth aspect of the invention, there is provided a transporter vehicle control method comprising: detecting an object at a front side of a transporter vehicle with a vessel by an object detection device provided in the transporter vehicle; determining a possibility of a collision between the transporter vehicle and the object based on a detection result of the object detection device; outputting a signal for reducing damage caused by the collision to a process system capable of performing a process for reducing the damage caused by the collision based on a determination result of the collision determination unit; and outputting process history data indicating at least a process state of the process system, wherein the outputting includes outputting position data of the transporter vehicle outputting the signal from the control unit and the process history data in association with each other.

Advantageous Effects of Invention

According to the aspect of the invention, it is possible to provide the transporter vehicle, the dump truck, and the transporter vehicle control method capable of recognizing a state having a possibility of a collision.

BRIEF DESCRIPTION OF DRAWINGS

FIG. 16 is a diagram illustrating an example of process history data.

DESCRIPTION OF EMBODIMENTS

Hereinafter, embodiments of the invention will be described with reference to the drawings, but the invention is not limited thereto. The components of the embodiments described below may be appropriately combined. Further, a part of the components may not be used in some cases.

<First Embodiment>

A first embodiment will be described.

(Mining Site of Mine)

Figure 1:
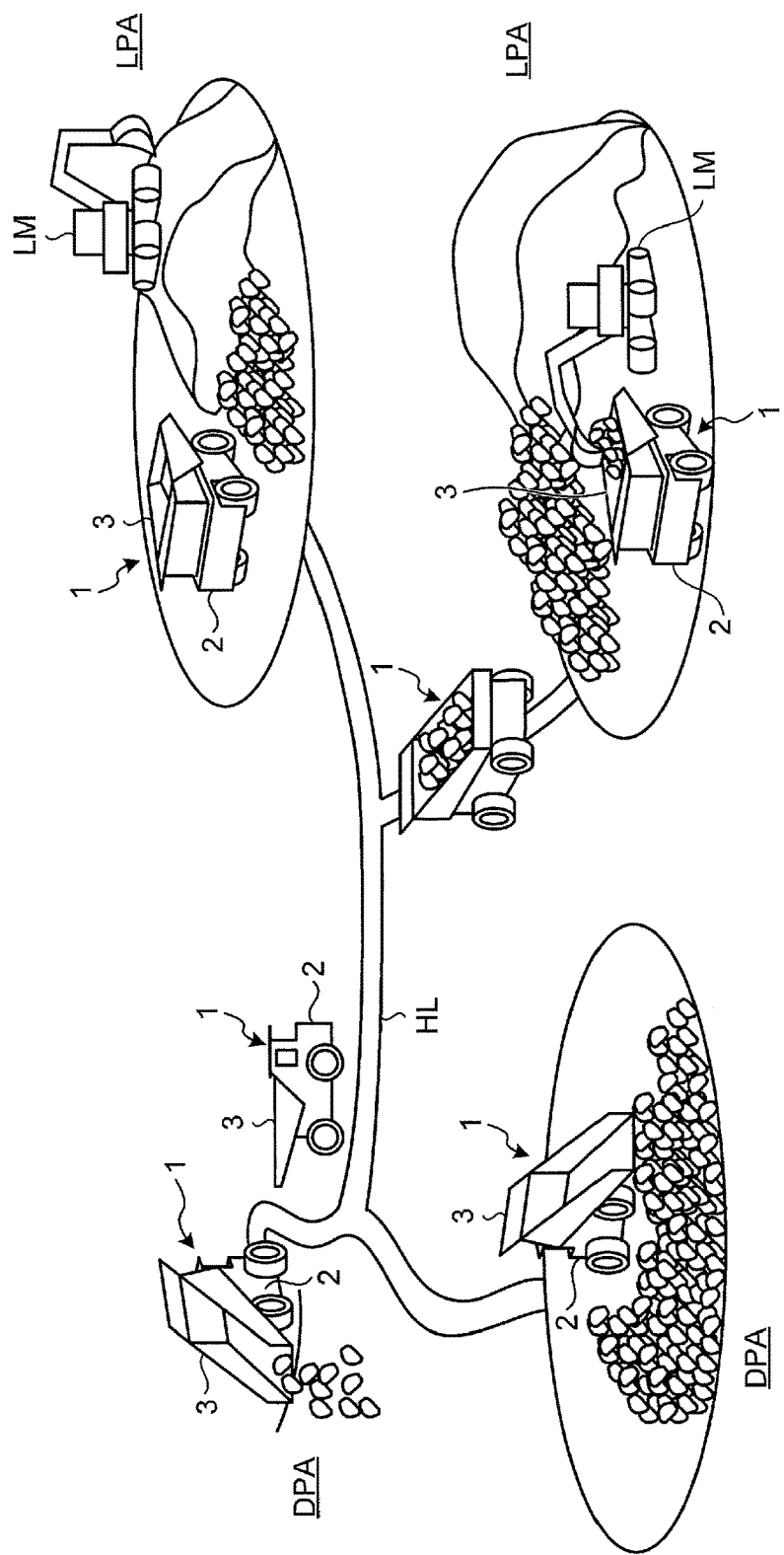
FIG. 1 is a schematic diagram illustrating an example of a mining site of a mine.

FIG. 1 is a schematic diagram illustrating an example of a mining site of a mine where a transporter vehicle according to the embodiment operates. The transporter vehicle is a dump truck 1 that includes a vehicle 2 and a vessel 3 provided in the vehicle 2. The dump truck 1 transports a load loaded on the vessel 3. The load includes mined crushed stone or at least one of soil and ore.

In the mining site of the mine, a traveling road HL is provided so as to be connected to a loading field LPA and a soil disposal field DPA or at least one of the loading field LPA and the soil disposal field DPA. The dump truck 1 may travel on at least one of the loading field LPA, the soil disposal field DPA, and the traveling road HL. The dump truck 1 may move between the loading field LPA and the soil disposal field DPA while traveling along the traveling road HL. Furthermore, the traveling road HL of the mining site of the mine is an unpaved road in many cases.

In the loading field LPA, a load may be loaded on the vessel 3. The load may be loaded on the vessel 3 by a loading machine LM. An excavator or a wheel loader is used as the loading machine LM. The dump truck 1 on which the load is loaded travels along the traveling road HL from the loading field LPA to the soil disposal field DPA. In the soil disposal field DPA, a load is discharged from the vessel 3. The dump truck 1 from which the load is discharged travels along the traveling road HL from the soil disposal field DPA to the loading field LPA. Furthermore, the dump truck 1 may travel from the soil disposal field DPA to a predetermined waiting station.

(Dump Truck)

Figure 2:
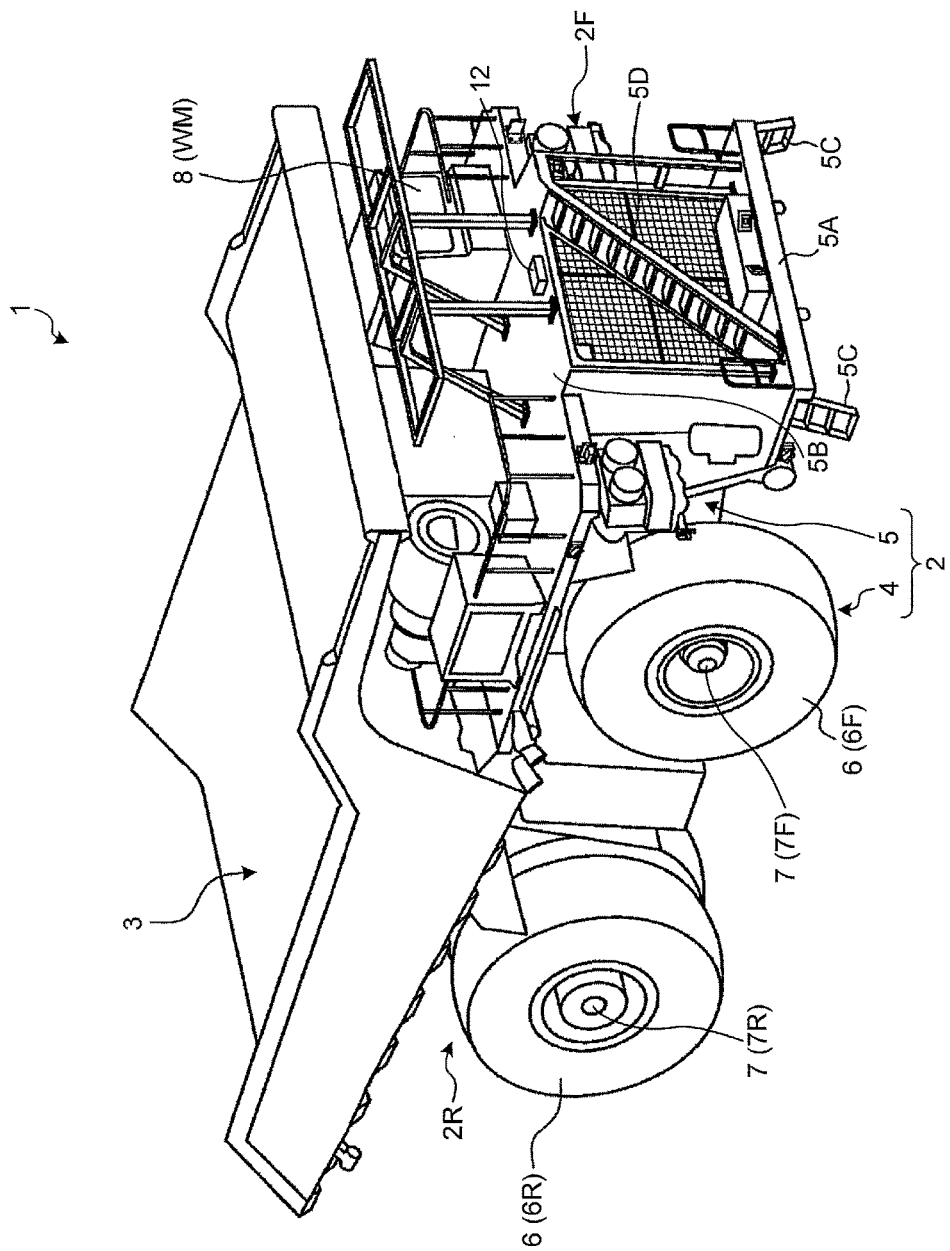
FIG. 2 is a perspective view illustrating an example of a transporter vehicle.

Next, the dump truck 1 will be described. FIG. 2 is a perspective view illustrating an example of the dump truck 1 according to the embodiment.

The dump truck 1 is a manned dump truck which is operated by a driver (operator) WM sitting in a cab (a driving room) 8. The dump truck 1 may be referred to as an off-highway truck. The dump truck 1 is a rigid dump truck 1.

The dump truck 1 includes the vehicle 2 which includes a front part 2F and a rear part 2R and the vessel 3 which is provided in the vehicle 2. The vehicle 2 includes a traveling device 4 and a vehicle body 5 of which at least a part is disposed above the traveling device 4. The vessel 3 is supported by the vehicle body 5.

The traveling device 4 includes a vehicle wheel 6 and an axle 7 which rotatably supports the vehicle wheel 6. The vehicle wheel 6 includes a wheel which is supported by the axle 7 and a tire which is supported by the wheel. The vehicle wheel 6 includes a front wheel 6F and a rear wheel 6R. The front wheel 6F includes one tire at each of the right and left sides. The rear wheel 6R includes two tires at each of right and left sides. Accordingly, the traveling device 4 includes four tires in the entire rear wheel 6R. The axle 7 includes an axle 7F which rotatably supports the front wheel 6F and an axle 7R which rotatably supports the rear wheel 6R.

The vehicle body 5 includes a lower deck 5A, an upper deck 5B, a movable ladder 5C which is disposed below the lower deck 5A, and a ladder 5D which is disposed so as to connect the lower deck 5A and the upper deck 5B. The lower deck 5A is disposed at the lower portion of the front part of the vehicle body 5. The upper deck 5B is disposed above the lower deck 5A in the front part of the vehicle body 5.

The vehicle 2 includes a cab 8. The cab 8 is disposed on the upper deck 5B. The operator WM sits in the cab 8, and operates the dump truck 1. The operator WM may be elevated with respect to the cab 8 by using the ladder 5C. The operator WM may move between the lower deck 5A and the upper deck 5B by using the ladder 5D.

The vessel 3 is a member on which a load is loaded. The vessel 3 may be elevated in the vertical direction with respect to the vehicle 2 by an elevation device. The elevation device includes an actuator such as a hydraulic cylinder (a hoist cylinder) disposed between the vessel 3 and the vehicle body 5. When a part of the vessel 3 is moved upward by the elevation device, the load of the vessel 3 is discharged.

(Cab)

Figure 3:
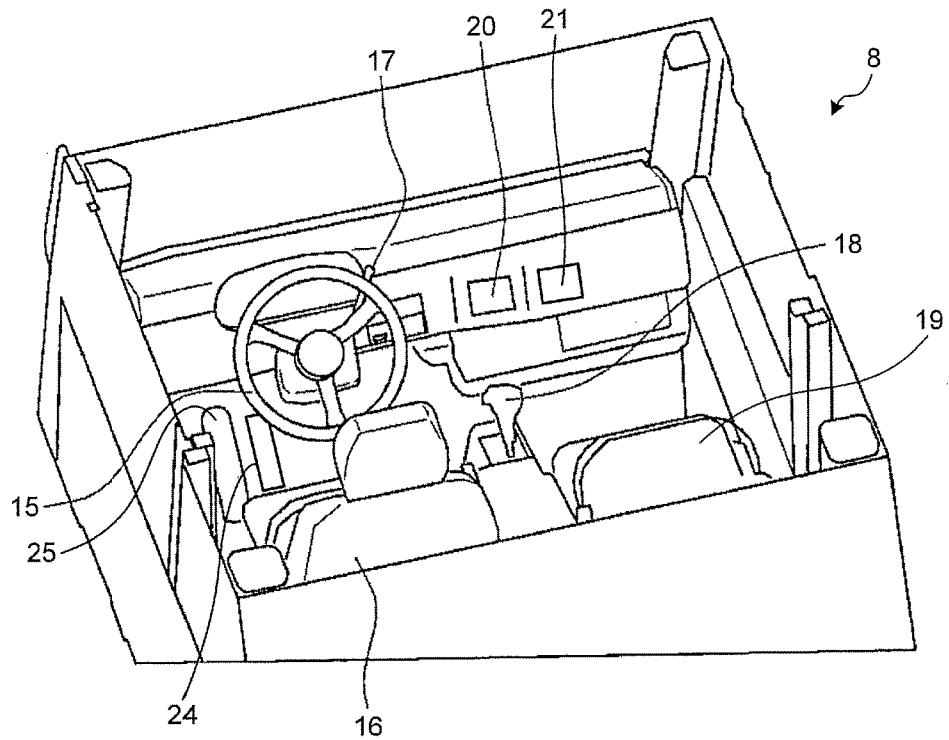
FIG. 3 is a diagram illustrating an example of a cab.

Next, the cab 8 will be described. FIG. 3 is a diagram illustrating an example of the cab 8 according to the embodiment. The cab 8 is provided with a plurality of operation devices which are operated by the operator WM sitting on the cab 8. As illustrated in FIG. 3, the cab 8 is provided with a driver seat 16, a trainer seat 19, an output operation unit 24, a brake operation unit 25, a traveling direction operation unit 15, a speed stage operation unit 18, a retarder operation unit 17, a display device 20 such as a flat panel display, and an alarm device 21 which generates an alarm. An operation device which is operated by the operator WM includes at least one of the output operation unit 24, the brake operation unit 25, the traveling direction operation unit 15, the speed stage operation unit 18, and the retarder operation unit 17.

(Collision Damage Reduction System)

Next, a collision damage reduction system 300S according to the embodiment will be described. In the embodiment, the dump truck 1 includes the collision damage reduction system 300S capable of performing a process for reducing damage caused by the collision between the dump truck 1 and an object in front of the dump truck 1.

Figure 4:
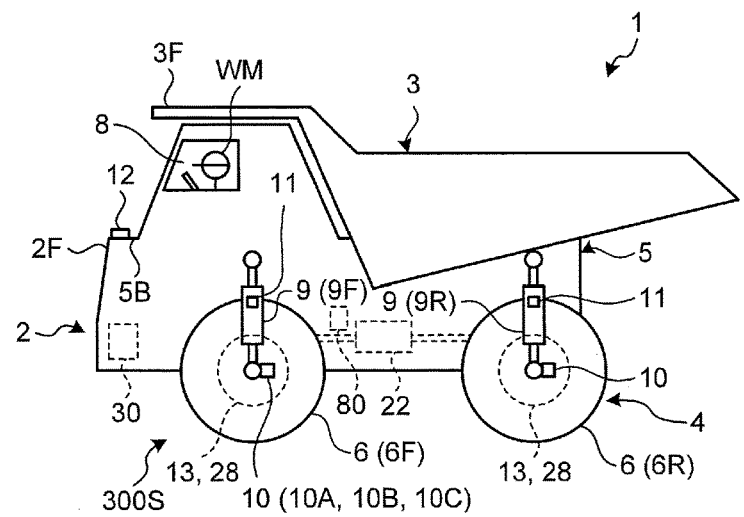
FIG. 4 is a schematic diagram illustrating an example of the transporter vehicle.
Figure 5:
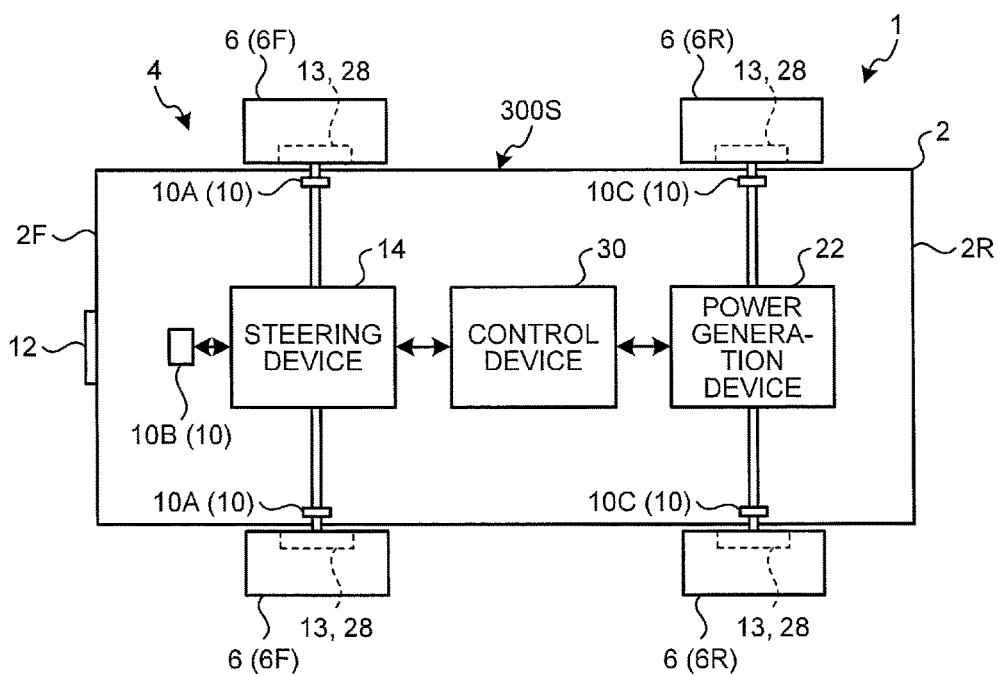
FIG. 5 is a schematic diagram illustrating an example of the transporter vehicle.

FIGS. 4 and 5 are schematic views illustrating an example of the dump truck 1 according to the embodiment. The dump truck 1 includes a traveling state detection device 10 which detects the traveling state of the dump truck 1 (the vehicle 2), a loading state detection device 11 which detects the loading state of the load of the vessel 3, an object detection device 12 which detects an object in front of the dump truck 1 (the vehicle 2), and a control device 30 which controls the dump truck 1. The collision damage reduction system 300S includes the object detection device 12. The detection result of the traveling state detection device 10, the detection result of the loading state detection device 11, and the detection result of the object detection device 12 are output to the control device 30. The control device 30 performs a process for preventing the collision between the dump truck 1 and the object based on the detection result.

The traveling state of the dump truck 1 includes at least one of the traveling speed of the dump truck 1, the traveling direction (the direction of the front part 2F or the front wheel 6F) of the dump truck 1, and the advancing direction (the forward or backward movement direction) of the dump truck 1.

The loading state of the load of the vessel 3 includes at least one of the state where a load is loaded on the vessel 3 and the weight of the load loaded on the vessel 3.

The dump truck 1 includes a power generation device 22 which generates a power, a suspension cylinder 9 of which a part is connected to the traveling device 4, a brake device 13 which stops the traveling device 4, and a speed change device 80. Furthermore, the speed change device 80 may not be provided in the case of the electrically driven dump truck 1 to be described later.

The traveling device 4 is driven by the power generated by the power generation device 22. The power generation device 22 drives the traveling device 4 in an electrical drive manner. The power generation device 22 includes an internal-combustion engine such as a diesel engine, a generator which is operated by the power of the internal-combustion engine, and a motor which is operated by the power generated by the generator. The power which is generated by the motor is transmitted to the vehicle wheel 6 of the traveling device 4. Accordingly, the traveling device 4 is driven. The self-running operation of the dump truck 1 is performed by the power of the power generation device 22 provided in the vehicle 2.

Furthermore, the power generation device 22 may drive the traveling device 4 in a mechanical drive manner. For example, the power which is generated by the internal-combustion engine may be transmitted to the vehicle wheel 6 of the traveling device 4 through a power transmission device. In the embodiment, the mechanically driven dump truck 1 will be exemplified.

The traveling device 4 includes a steering device 14 which changes the traveling direction (the direction of the front part 2F) of the dump truck 1. The steering device 14 changes the traveling direction of the dump truck 1 by changing the direction of the front wheel 6F.

The power generation device 22 is operated by the output operation unit 24 provided in the cab 8. The output operation unit 24 includes a pedal operation unit such as an accelerator pedal. The operator WM may adjust the output of the power generation device 22 by operating the output operation unit 24. When the output of the power generation device 22 is adjusted, the traveling speed of the dump truck 1 is adjusted.

The brake device 13 is operated by the brake operation unit 25 provided in the cab 8. The brake operation unit 25 includes a pedal operation unit such as a brake pedal. The operator WM may operate the brake device 13 by operating the brake operation unit 25. When the brake device 13 is operated, the traveling speed of the dump truck 1 is adjusted.

The steering device 14 is operated by the traveling direction operation unit 15 provided in the cab 8. The traveling direction operation unit 15 is, for example, a handle, and includes a handle operation unit. The operator WM may operate the steering device 14 by operating the traveling direction operation unit 15. When the steering device 14 is operated, the traveling direction of the dump truck 1 is adjusted.

Further, the speed change device 80 is, for example, a transmission, and is operated by the speed stage operation unit 18 provided in the cab 8. The speed stage operation unit 18 includes a lever operation unit such as a shift lever. The operator WM may change the advancing direction of the traveling device 4 by operating the speed stage operation unit 18. When the speed stage operation unit 18 is operated, the speed change device 80 changes the rotation direction of the vehicle wheel 6 in order to cause the dump truck 1 to move forward or backward.

The suspension cylinder 9 is disposed between the vehicle wheel 6 and the vehicle body 5. The suspension cylinder 9 includes a suspension cylinder 9F which is disposed between the front wheel 6F and the vehicle body 5 and a suspension cylinder 9R which is disposed between the rear wheel 6R and the vehicle body 5. That is, the suspension cylinder 9 is provided in each of the vehicle wheels 6 disposed at the front, rear, left, and right positions. A load based on the weight of the vehicle body 5 and the load acts on the vehicle wheel 6 through the suspension cylinder 9.

The traveling state detection device 10 includes a traveling speed detection device 10A which detects the traveling speed of the dump truck 1, a traveling direction detection device 10B which detects the traveling direction of the dump truck 1, and an advancing direction detection device 10C which detects whether the dump truck 1 moves forward or backward.

The traveling speed detection device 10A detects the traveling speed of the dump truck 1 (the vehicle 2). The traveling speed detection device 10A includes a rotation speed sensor which detects the rotation speed of the vehicle wheel 6 (the axle 7). The rotation speed of the vehicle wheel 6 is involved with the traveling speed of the dump truck 1. The detection value (the rotation speed value) of the rotation speed sensor is converted into the traveling speed value of the dump truck 1. The traveling speed detection device 10A detects the traveling speed of the dump truck 1 based on the detection value of the rotation speed sensor.

The traveling direction detection device 10B detects the traveling direction of the dump truck 1 (the vehicle 2). The traveling direction of the dump truck 1 includes the direction of the front part (the front surface) 2F of the vehicle 2 when the dump truck 1 moves forward. The traveling direction of the dump truck 1 includes the direction of the front wheel 6F when the dump truck 1 moves forward. The traveling direction detection device 10B includes a steering sensor which detects the steering angle of the steering device 14. For example, a rotary encoder may be used as the steering sensor. The traveling direction detection device 10B detects the steering angle by detecting the operation amount of the steering device 14. The traveling direction detection device 10B detects the traveling direction of the dump truck 1 by using the steering sensor. Furthermore, the traveling direction detection device 10B may include a rotation amount sensor which detects the steering angle or the rotation amount of the traveling direction operation unit 15. That is, the steering angle of the traveling direction operation unit 15 involves with the steering angle of the steering device 14 of the dump truck 1.

The advancing direction detection device 100 detects the advancing direction of the dump truck 1 (the vehicle 2). The advancing direction detection device 100 detects whether the dump truck 1 moves forward or backward. When the dump truck 1 moves forward, the front part 2F of the vehicle 2 is located at the front side in the advancing direction. When the dump truck 1 moves backward, the rear part 2R of the vehicle 2 is located at the front side in the advancing direction. The advancing direction detection device 100 includes a rotation direction sensor which detects the rotation direction of the vehicle wheel 6 (the axle 7). The advancing direction detection device 100 detects whether the dump truck 1 moves forward or backward based on the detection value of the rotation direction sensor. Furthermore, the advancing direction detection device 100 may include a sensor which detects the operation state of the speed stage operation unit 18.

The loading state detection device 11 detects at least one of the state where a load is loaded on the vessel 3 and the weight of the load loaded on the vessel 3. The loading state detection device 11 includes a weight sensor which detects the weight of the vessel 3. The weight of the empty vessel 3 is given information. The loading state detection device 11 may obtain the weight of the load loaded on the vessel 3 based on the detection value of the weight sensor and the weight value of the empty vessel 3 as given information. That is, the loading state detection device 11 may obtain the weight of the load loaded on the vessel 3 by subtracting the weight value of the vessel 3 from the detection value.

In the embodiment, the weight sensor of the loading state detection device 11 includes a pressure sensor which detects the pressure of the working oil in the space inside the suspension cylinder 9. The pressure sensor detects a load acting on the suspension cylinder 9 by detecting the pressure of the working oil. The suspension cylinder 9 includes a cylinder portion and a piston portion which is movable relative to the cylinder portion. The working oil is enclosed in the inner space between the cylinder portion and the piston portion. When a load is loaded on the vessel 3, the cylinder portion and the piston portion move relatively so that the pressure of the working oil in the inner space increases. When a load is discharged from the vessel 3, the cylinder portion and the piston portion move relatively so that the pressure of the working oil in the inner space decreases. The pressure sensor detects the pressure of the working oil. The pressure of the working oil is involved with the weight of the load. The detection value (the pressure value) of the pressure sensor is converted into the weight of the load value. The loading state detection device 11 detects the weight of the load based on the detection value of the pressure sensor (the weight sensor).

In the embodiment, the pressure sensor is disposed in each of the plurality of suspension cylinders 9. The dump truck 1 includes four vehicle wheels 6. The pressure sensor is disposed in each of the suspension cylinders 9 provided in four vehicle wheels 6. The loading state detection device 11 may obtain the weight of the load based on the sum value or the average value of the detection values of four pressure sensors. The loading state detection device 11 may obtain the weight of the load based on the detection value of a specific pressure sensor (for example, the pressure sensor disposed in the suspension cylinder 9R) among four pressure sensors.

Furthermore, the load transportation amount of the dump truck 1 per unit time may be managed based on the detection result of the pressure sensor (the weight sensor) of the loading state detection device 11. For example, the load transportation amount (the work amount) of the dump truck 1 for one day may be stored in a storage device mounted on the dump truck 1 based on the detection result of the pressure sensor.

Furthermore, the loading state detection device 11 may be configured as a weight sensor disposed between the vessel 3 and the vehicle body 5. The weight sensor may be a strain gauge type load cell provided between the vessel 3 and the vehicle body 5. The loading state detection device 11 may be configured as a pressure sensor which detects the hydraulic pressure of the hydraulic cylinder (the hoist cylinder) detecting the hydraulic pressure of raising the vessel 3.

The object detection device 12 detects an object existing in front of the dump truck 1 (the vehicle 2) in a non-contact state. The object detection device 12 includes a radar device (a millimeter wave radar device). The radar device may detect the object existing at the front side by sending an electric wave (or an ultrasonic wave) and receiving the electric wave (or the ultrasonic wave) reflected from the object. Further, the radar device may detect not only the existence of the object, but also the relative position (the relative distance and the orientation) with respect to the object and the relative speed with respect to the object. Furthermore, the object detection device 12 may include at least one of a laser scanner and a three-dimensional distance sensor. Further, the object detection device 12 may be provided at a plurality of positions.

The object detection device 12 is disposed in the front part 2F of the vehicle 2. In the embodiment, as illustrated in FIG. 2, the object detection device 12 is disposed in the upper deck 5B. Furthermore, the object detection device 12 may detect the object in front of the dump truck 1. The object detection device 12 may be disposed in the lower deck 5A.

Furthermore, since the upper deck 5B is provided with the object detection device 12, it is possible to prevent a problem in which unevenness existing on a road surface (a ground surface) contacting the vehicle wheel 6 is erroneously detected as an object by the object detection device 12 even when the unevenness exists. Furthermore, when an electric wave is emitted from the radar device, the strength of the electric wave emitted from the unevenness of the road surface is smaller than the strength of the electric wave reflected from the object as the detection target. The radar device may include a filter device which receives a large-strength electric wave and cuts a low-strength electric wave so that the electric wave reflected from the object is received and the electric wave reflected from the unevenness of the road surface is not erroneously detected.

Figure 6:
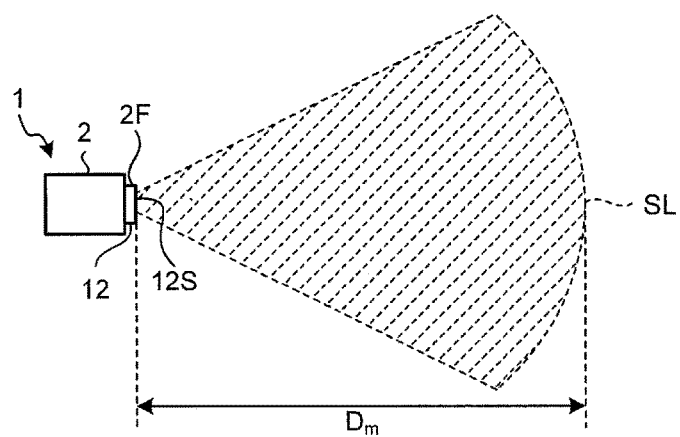
FIG. 6 is a schematic diagram illustrating an example of an object detection device.

FIG. 6 is a schematic diagram illustrating an example of the object detection device 12 according to the embodiment. As illustrated in FIG. 6, the object detection device 12 includes a radar device (a millimeter wave radar device) which is disposed in the front part 2F of the vehicle 2. The radar device includes a detection area SL in which an object at the front side of the dump truck 1 may be detected. As indicated by the diagonal line of FIG. 6, the detection area SL extends radially from a light emission portion 12S in the up and down direction and the right and left direction. The object detection device 12 may detect an object existing in the detection area SL. In the front direction of the dump truck 1, the dimension of the detection area SL of the object detection device 12 is indicated by Dm. The dimension Dm is a distance between the front end of the detection area SL and the light emission portion 12S of the object detection device 12 that emits at least one of a radio wave and an ultrasonic wave.

(Control System)

Figure 7:
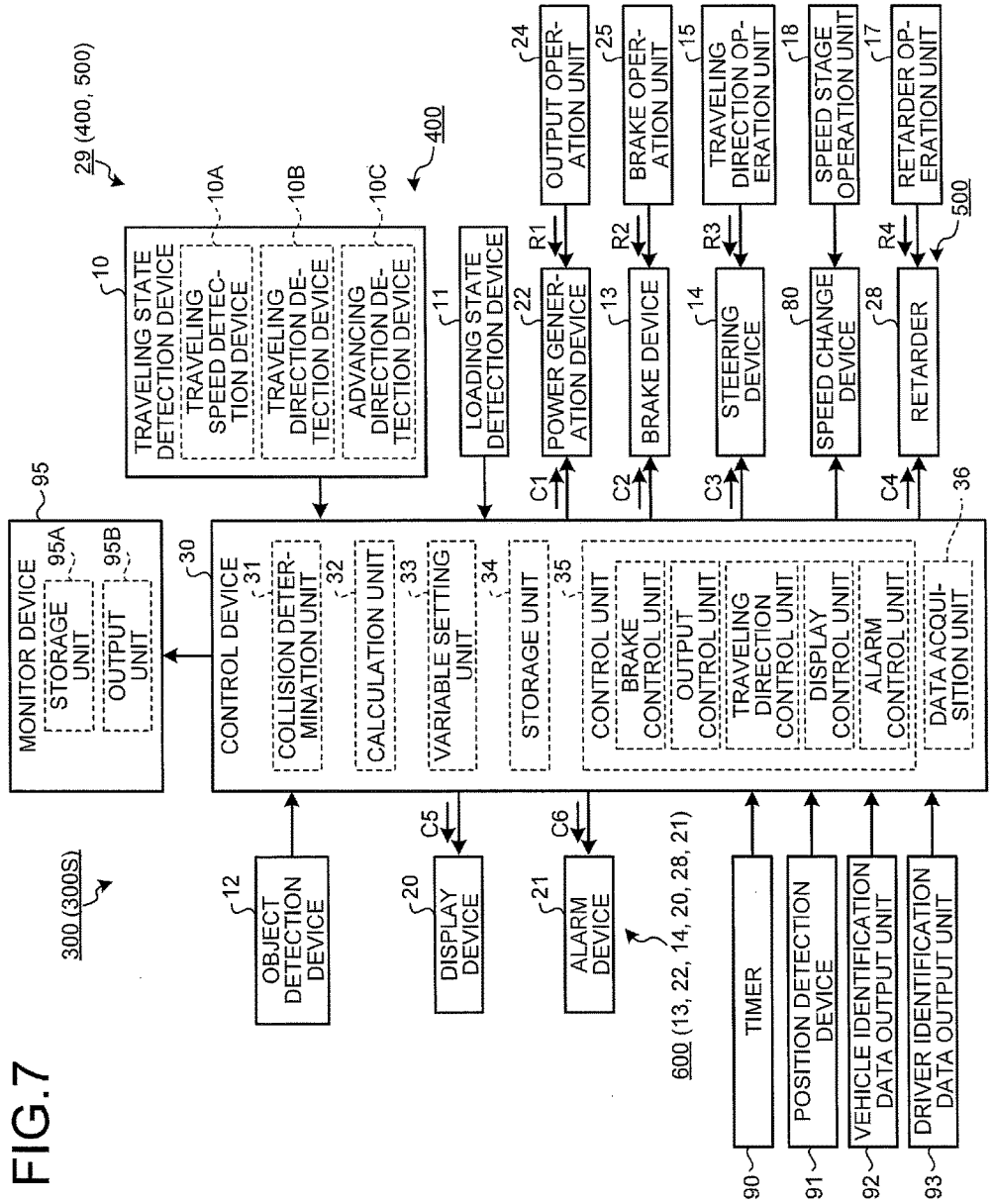
FIG. 7 is a functional block diagram illustrating an example of a control system.

Next, an example of a control system 300 of the dump truck 1 according to the embodiment will be described. FIG. 7 is a functional block diagram illustrating an example of the control system 300 according to the embodiment. The control system 300 includes the collision damage reduction system 300S.

As illustrated in FIG. 7, the control system 300 includes the control device 30 which controls the dump truck 1 and a vehicle control device 29 which is connected to the control device 30. The vehicle control device 29 includes a state quantity detection system 400 which detects the state quantity of the dump truck 1 and a traveling condition adjustment system 500 which adjusts the traveling condition of the dump truck 1. The state quantity detection system 400 includes, for example, the traveling state detection device 10 and the loading state detection device 11. The traveling condition adjustment system 500 includes, for example, the power generation device 22, the brake device 13, the traveling device 4 (the steering device 14), and a retarder 28. The object detection device 12, the display device 20, and the alarm device 21 are connected to the control device 30.

Further, the control system 300 includes a timer 90 which measures a time point or a time, a position detection device 91 which detects the position of the dump truck 1, a vehicle identification data output unit 92 which outputs identification data (vehicle identification data) of the dump truck 1 (the vehicle 2), a driver identification data output unit 93 which outputs identification data (driver identification data) of the driver WM that operates the dump truck 1 (the vehicle 2), and a monitor device 95. Furthermore, the display device 20 and the monitor device 95 may be integrated with each other.

The output operation unit 24 is connected to the power generation device 22. The brake operation unit 25 is connected to the brake device 13. The traveling direction operation unit 15 is connected to the steering device 14. The speed stage operation unit 18 is connected to the speed change device 80. The retarder operation unit 17 is connected to the retarder 28.

Each of the brake device 13 and the retarder 28 is a brake device that may perform a brake process on the traveling device 4 of the vehicle 2. The brake device decelerates or stops the dump truck 1 by performing the brake process. In the embodiment, the brake device 13 and the retarder 28 includes a common brake device. Even when the operator WM operates the brake operation unit 25 or the retarder operation unit 17, the common brake device is operated, and hence the dump truck 1 may be braked. When the dump truck 1 moves down along a sloping road, the retarder 28 adjusts the braking force so that the dump truck 1 travels at a constant speed. The retarder 28 serves as an auxiliary brake. When the dump truck 1 moves down along the sloping road, the brake device generates a predetermined braking force in a manner such that the operator WM operates the retarder operation unit 17 so as to operate the retarder 28. Further, the retarder 28 adjusts the braking force of the brake device based on the traveling speed of the dump truck 1 detected by the traveling speed detection device 10A. Furthermore, the retarder 28 may be a brake device different from the brake device 13. The retarder 28 may include, for example, a brake device with at least one of a hydraulic retarder and an electromagnetic retarder.

The control device 30 includes a numerical calculation device (a processor) such as a CPU (Central Processing Unit). The control device 30 includes a collision determination unit 31 which determines the possibility of the collision between the dump truck 1 and the object at the front side of the dump truck 1 based on the detection result of the object detection device 12, a calculation unit 32 which calculates time information used in the determination of the possibility of the collision, a variable setting unit 33 which sets a variable used in the determination of the possibility of the collision, a storage unit 34 which stores information used in the determination of the possibility of the collision, a control unit 35 which outputs the control signal C for reducing the damage caused by the collision, and a data acquisition unit 36 which acquires data.

The storage unit 34 includes at least one of RAM (Random Access Memory), ROM (Read Only Memory), flash memory, and a hard disk.

The traveling state detection device 10 detects the traveling state of the dump truck 1 and outputs the detection result to the collision determination unit 31. The loading state detection device 11 detects the loading state of the load of the vessel 3 and outputs the detection result to the collision determination unit 31. The object detection device 12 detects the object in front of the dump truck 1 and outputs the detection result to the collision determination unit 31. The collision determination unit 31 determines the possibility of the collision between the dump truck 1 and the object based on the detection result of the traveling state detection device 10, the detection result of the loading state detection device 11, and the detection result of the object detection device 12.

The dump truck 1 includes a process system 600 capable of performing a process for reducing damage caused by the collision with the object. The process system 600 includes a plurality of process devices capable of performing different processes for reducing damage caused by the collision between the dump truck 1 and the object. In the embodiment, the process device of the process system 600 includes at least one of, for example, the brake device 13, the power generation device 22, the steering device 14, the display device 20, the retarder 28, and the alarm device 21. The brake device 13, the retarder 28, the power generation device 22, the steering device 14, the display device 20, and the alarm device 21 may respectively perform different processes for reducing damage caused by the collision. The process system 600 is controlled by the control device 30.

The brake device 13 may decrease the traveling speed of the dump truck 1 or stop the traveling dump truck 1 by performing a brake process (a stop process) on the traveling device 4. Accordingly, damage caused by the collision between the dump truck 1 and the front object is reduced.

The retarder 28 may reduce the traveling speed of the dump truck 1 or stop the traveling operation of the dump truck 1 by performing a brake process (a stop process) on the traveling device 4. Accordingly, damage caused by the collision between the dump truck 1 and the front object is reduced.

The power generation device 22 may decrease the traveling speed of the dump truck 1 by performing an output reduction process for reducing the output (the driving force) with respect to the traveling device 4. Accordingly, damage caused by the collision between the dump truck 1 and the front object is reduced.

The steering device 14 changes the traveling direction of the dump truck 1 so that an object does not exist on the traveling road of the dump truck 1 by performing the traveling direction change process of the dump truck 1 in response to a control signal C3 from the control unit (the traveling direction control unit) 35 or an operation signal R3 from the traveling direction operation unit 15. Accordingly, damage caused by the collision between the dump truck 1 and the front object is reduced.

The display device 20 may perform, for example, a display process for refreshing the attention of the operator WM. The display device 20 may generate an alarm for the operator WM by displaying an alarm image. The alarm image may be, for example, an alarm mark or a message for notifying the possibility of the collision with the object existing at the front side. Accordingly, an operation for reducing damage caused by the collision with the operator WM, for example, an operation of at least one of the output operation unit 24, the brake operation unit 25, the retarder operation unit 17, and the traveling direction operation unit 15 is performed, and hence damage caused by the collision between the dump truck 1 and the front object is reduced.

The alarm device 21 may perform an alarm generation process for refreshing the attention of the operator WM. The alarm device 21 may generate an alarm for the operator WM by making a sound or light for notifying the possibility of the collision with the object existing at the front side by using, for example, a speaker or a lamp. The alarm device 21 may include a vibration generation device capable of generating an alarm for the operator WM by vibrating at least one of the traveling direction operation unit 15 and the driver seat 16. The alarm device 21 may include a seat belt adjustment device capable of generating an alarm for the operator WM by changing the binding force of the seat belt used to protect the operator WM sitting on the driver seat 16. Accordingly, an operation for reducing damage caused by the collision is performed by the operator WM, and hence damage caused by the collision between the dump truck 1 and the front object is reduced.

The control unit 35 outputs the control signal C for reducing damage caused by the collision to the process system 600 (at least one of the brake device 13, the power generation device 22, the steering device 14, the display device 20, the retarder 28, and the alarm device 21) based on the determination result of the collision determination unit 31. The process system 600 to which the control signal C is supplied from the control unit 35 performs a process for reducing damage caused by the collision between the dump truck 1 and the object.

When it is determined that there is a high possibility that the dump truck 1 and the object may collide with each other, the control unit (the output control unit) 35 may output the control signal C1 to the power generation device 22 so that the output reduction process is performed. The power generation device 22 reduces the output based on the control signal C1 supplied from the control unit 35 and reduces the driving force with respect to the traveling device 4. Accordingly, the traveling speed of the dump truck 1 is decreased, and hence damage caused by the collision between the dump truck 1 and the object is reduced.

When it is determined that there is a high possibility of the collision between the dump truck 1 and the object, the control unit (the brake control unit) 35 outputs a control signal C4 to the retarder 28 so that a brake process is performed. The retarder 28 is operated based on the control signal C4 supplied from the control unit 35. Here, when it is determined that there is a high possibility of the collision between the dump truck 1 and the object, the control unit (the brake control unit) 35 may output a control signal C2 to the brake device 13. Accordingly, the traveling speed of the dump truck 1 is decreased or the traveling dump truck 1 is stopped, and hence damage caused by the collision between the dump truck 1 and the object is reduced.

When it is determined that there is a high possibility that the dump truck 1 and the object may collide with each other, the control unit (the traveling direction control unit) 35 may output the control signal C3 to the steering device 14 so that the traveling direction change process is performed. The steering device 14 is operated based on the control signal C3 supplied from the control unit 35. Accordingly, the traveling direction of the dump truck 1 is changed so that an object does not disposed in the traveling road of the dump truck 1, and hence damage caused by the collision between the dump truck 1 and the object is reduced.

When it is determined that there is a high possibility that the dump truck 1 and the object may collide with each other, the control unit (the alarm control unit) 35 may output a control signal C6 to the alarm device 21 so that the alarm generation process is performed. As described above, the alarm device 21 is operated based on the control signal C6 supplied from the control unit 35. The alarm device 21 generates a sound or light for refreshing the attention of the operator WM. Accordingly, any operation for reducing damage caused by the collision with the operator WM is performed, and the operation signals R (R1, R2, R3, and R4) caused by the operation are supplied to the process system 600. Accordingly, damage caused by the collision between the dump truck 1 and the object is reduced.

When it is determined that there is a high possibility that the dump truck 1 and the object may collide with each other, the control unit (the display control unit) 35 may output a control signal C5 to the display device 20 so that the display process is performed as described above. The display device 20 is operated based on the control signal C5 supplied from the control unit 35. The display device 20 displays an image for refreshing the attention of the operator WM. Accordingly, any operation for reducing damage caused by the collision with the operator WM is performed, and the operation signals R (R1, R2, R3, and R4) caused by the operation are supplied to the process system 600. Accordingly, damage caused by the collision between the dump truck 1 and the object is reduced.

The operation for reducing damage caused by the collision performed by the operator WM includes at least one of the operation of the output operation unit 24 for reducing the output of the power generation device 22, the operation of the brake operation unit 25 for operating the brake device 13, the operation of the retarder operation unit 17 for operating the retarder 28, and the operation of the traveling direction operation unit 15 for changing the traveling direction of the dump truck 1 by the steering device 14. When the output operation unit 24 is operated, the operation signal R1 is generated. The output of the power generation device 22 is reduced based on the operation signal R1 generated by the output operation unit 24. When the brake operation unit 25 is operated, the operation signal R2 is generated. The brake device 13 is operated based on the operation signal R2 generated by the brake operation unit 25, and hence the dump truck 1 is decelerated. When the traveling direction operation unit 15 is operated, the operation signal R3 is generated. The steering device 14 is operated based on the operation signal R3 generated by the traveling direction operation unit 15. When the retarder operation unit 17 is operated, the operation signal R4 is generated. The retarder 28 is operated based on the operation signal R4 generated by the retarder operation unit 17, and hence the dump truck 1 is decelerated.

The power generation device 22 is connected to each of the output control unit 35 and the output operation unit 24. The output operation unit 24 generates the operation signal R1 in response to the operation amount of the operator WM, and supplies the operation signal to the power generation device 22. The power generation device 22 generates an output based on the operation signal R1. The output control unit 35 generates the control signal C1 for controlling the power generation device 22, and supplies the control signal to the power generation device 22. The power generation device 22 generates an output based on the control signal C1.

The retarder 28 is connected to each of the retarder operation unit 17 and the brake control unit 35. The retarder operation unit 17 generates the operation signal R4 in response to the operation of the operator WM, and supplies the operation signal to the retarder 28. The retarder 28 generates a braking force based on the operation signal R4. The brake control unit 35 generates a control signal C4 for controlling the retarder 28, and supplies the control signal to the retarder 28. The retarder 28 generates a braking force based on the control signal C4.

The brake device 13 is connected to each of the brake operation unit 25 and the brake control unit 35. The brake operation unit 25 generates the operation signal R2 in response to the operation amount of the operator WM, and supplies the operation signal to the brake device 13. The brake device 13 generates a braking force based on the operation signal R2. The brake control unit 35 generates the control signal C4 or the control signal C2 for controlling the retarder 28 or the brake device 13, and supplies the control signal to the retarder 28 or the brake device 13. The retarder 28 generates a braking force based on the control signal C4. The brake device 13 generates a braking force based on the control signal C2. In the description below, a case will be described in which the brake control unit 35 generates only the control signal C4 with respect to the retarder 28 when it is determined that there is a high possibility that the dump truck 1 and the object may collide with each other due to the existence of the object in front of the dump truck 1.

The steering device 14 is connected to each of the traveling direction operation unit 15 and the traveling direction control unit 35. The traveling direction operation unit 15 generates the operation signal R3 in response to the operation amount of the operator WM, and supplies the operation signal to the steering device 14. The steering device 14 changes the direction of the front wheel 6F so that the traveling direction of the traveling device 4 is changed based on the operation signal R3. The traveling direction control unit 35 generates the control signal C3 for controlling the steering device 14, and supplies the control signal to the steering device 14. The steering device 14 changes the direction of the front wheel 6F so that the traveling direction of the traveling device 4 is changed based on the control signal C3.

The timer 90 measures a time point or a time. As the timer 90, for example, a clock IC may be used. The timer 90 is driven in accordance with the calendar or the time of the site where the dump truck 1 is operated. The timer 90 outputs the measured time point data to the control device 30. Furthermore, a time point or a time may be measured by using a global positioning system along with the timer 90 or instead of the timer 90.

The position detection device 91 includes a global positioning system (GPS). By the position detection device 91, the position of the dump truck 1 (the vehicle 2) is detected in a global coordinate system (GPS coordinate system). The global positioning system includes a GPS satellite, and detects the position of the dump truck 1 in the GPS coordinate system that defines the latitude, the longitude, and the altitude. In the embodiment, the position detection device 91 includes a GPS receiver that belongs to the dump truck 1. By the position detection device 91, the position (the absolute position) of the dump truck 1 in the mine is detected. The position detection device 91 serves as a position data acquisition unit and outputs the position data of the dump truck 1 (the vehicle 2) to the control device 30.

The vehicle identification data output unit 92 outputs the vehicle identification data of the dump truck 1 (the vehicle 2) to the control device 30. In the mine, there is a case in which a plurality of the dump trucks 1 may be operated. The vehicle identification data (the vehicle ID) is given to each of the dump trucks 1. The vehicle identification data output unit 92 stores the vehicle identification data. The vehicle identification data output unit 92 outputs the vehicle identification data to the control device 30. Furthermore, it is not assumed that the plurality of dump trucks 1 need to be operated in the same mine. This is because the manager of the dump truck 1 may manage the plurality of dump trucks 1 operated in the other operation sites.

The driver identification data output unit 93 outputs the driver identification data of the driver WM of the dump truck 1 (the vehicle 2) to the control device 30. In the mine, there is a case in which a plurality of the drivers WM may work. Various operation examples exist in which the plurality of dump trucks 1 are respectively allocated to the drivers WM so that the drivers WM respectively drive only the dump trucks 1 allocated thereto and the plurality of drivers WM alternatively drive one dump truck 1. The driver identification data (the driver ID) is given to each of the drivers WM. For example, the ID key that stores the driver identification data is given to each driver WM. There is a possibility that the driver WM may drive a different dump truck 1. The driver identification data output unit 93 is used to communicate with, for example, the ID key in a wireless manner, and the driver identification data output unit 93 receives the driver identification data from the ID key. The driver identification data output unit 93 outputs the driver identification data to the control device 30.

The traveling state detection device 10 outputs traveling state data of the dump truck 1 (the vehicle 2) to the control device 30. As described above, the traveling state of the dump truck 1 includes at least one of the traveling speed of the dump truck 1, the traveling direction (the direction of the front part 2F or the front wheel 6F) of the dump truck 1, and the advancing direction (the forward movement direction or the backward movement direction) of the dump truck 1. The traveling speed detection device 10A of the traveling state detection device 10 outputs the traveling speed data of the dump truck 1 to the control device 30. The traveling direction detection device 10B of the traveling state detection device 10 outputs the traveling direction data of the dump truck 1 to the control device 30. The advancing direction detection device 10C of the traveling state detection device 10 outputs the advancing direction data of the dump truck 1 to the control device 30.

The loading state detection device 11 outputs the loaded state data of the load of the vessel 3 to the control device 30. As described above, the loaded state data of the load of the vessel 3 includes at least one of the existence of the load of the vessel 3 and the weight of the load loaded on the vessel 3. The loading state detection device 11 outputs data indicating the existence of the load of the vessel 3 to the control device 30. The loading state detection device 11 outputs the weight data of the load loaded on the vessel 3 to the control device 30.

The data acquisition unit 36 acquires the time point data output from the timer 90. The data acquisition unit 36 acquires the position data of the dump truck 1 output from the position detection device 91. The data acquisition unit 36 acquires the vehicle identification data output from the vehicle identification data output unit 92. The data acquisition unit 36 acquires the driver identification data output from the driver identification data output unit 93. The data acquisition unit 36 acquires the traveling state data (at least one of the traveling speed data, the traveling direction data, and the advancing direction data) output from the traveling state detection device 10. The data acquisition unit 36 acquires the loaded state data (at least one of the load existence data and the load weight data) output from the loading state detection device 11. The data acquisition unit 36 serves as the time point data acquisition unit, the position data acquisition unit, the vehicle identification data acquisition unit, the driver identification data acquisition unit, the traveling state data acquisition unit, and the loaded state data acquisition unit.

The monitor device 95 monitors various data of the dump truck 1. The monitor device 95 includes a storage unit 95A and an output unit 95B. The monitor device 95 monitors the data (at least one of the time point data, the position data, the vehicle identification data, the driver identification data, the traveling state data, and the loaded state data) of the data acquisition unit 36. In the embodiment, the timer 90, the position detection device 91, the vehicle identification data output unit 92, the driver identification data output unit 93, the traveling state detection device 10, and the loading state detection device 11 respectively output data to the data acquisition unit 36 at a predetermined period. The monitor device 95 monitors the data acquired from the data acquisition unit 36. The monitor device 95 stores the data acquired by the data acquisition unit 36 in the storage unit 95A. The monitor device 95 outputs the data acquired by the data acquisition unit 36 from the output unit 95B to an external device.

The storage unit 95A includes at least one of RAM (Random Access Memory), ROM (Read Only Memory), flash memory, and a hard disk.

The output unit 95B includes a communication unit used for the wireless communication of the data. The output unit 95B outputs the data to the external device by a wireless communication. By using the satellite communication, the data may be output from the output unit 95B to the external device. The data may be output from the output unit 95B to the external device by using a cellular phone communication network. Alternatively, the data may be output from the output unit 95B to the external device by using a wireless LAN system. Furthermore, the data may be output from the output unit 95B to the external device by a wired communication. For example, the output unit 95B and the external device may be connected to each other via a cable, and the data may be output from the output unit 95B to the external device via the cable. Furthermore, the output unit 95B and the storage unit 95A may be assembled in, for example, the control device 30.

(Dump Truck Control Method)

Next, an example of a method of controlling the dump truck 1 will be described. In the embodiment, an example of a control method of reducing damage caused by the collision between the dump truck 1 and the object existing at the front side of the dump truck 1 will be mainly described. In the description below, the object is assumed as the other dump truck 1F existing in front of the dump truck 1. In the embodiment, an example of a control method of reducing damage caused by the crash between the dump truck 1 and the dump truck 1F in front of the dump truck 1 will be mainly described. In the description below, the dump truck 1F in front of the dump truck 1 is appropriately referred to as the front dump truck 1F.

Figure 8:
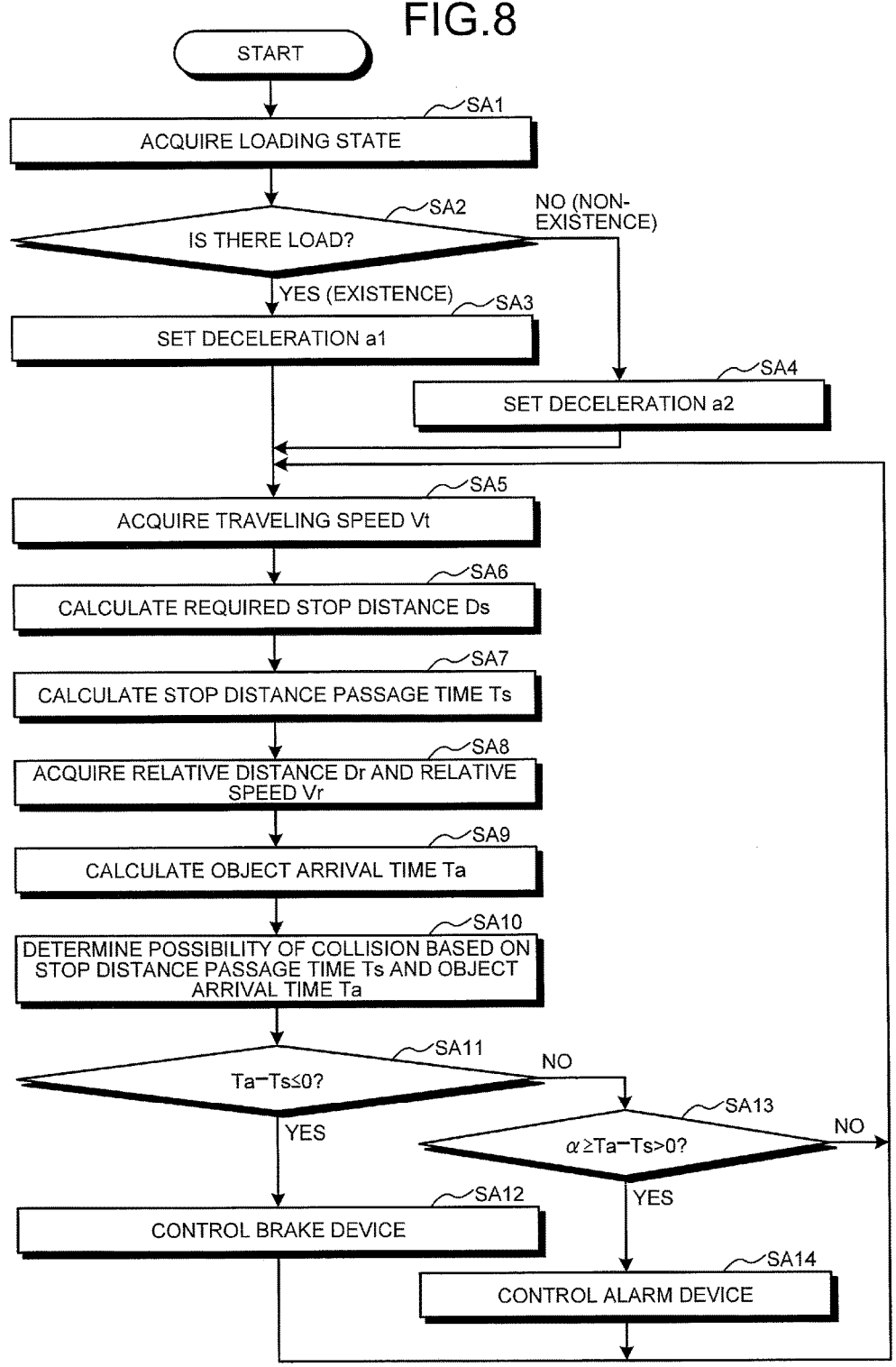
FIG. 8 is a flowchart illustrating an example of a transporter vehicle control method.

FIG. 8 is a flowchart illustrating an example of a method of controlling the dump truck 1 according to the embodiment. The loading state detection device 11 detects the loading state of the load of the vessel 3. The detection result of the loading state detection device 11 is output to the control device 30. The control device 30 acquires the detection result of the loading state detection device 11 (step SA1).

Figure 9:
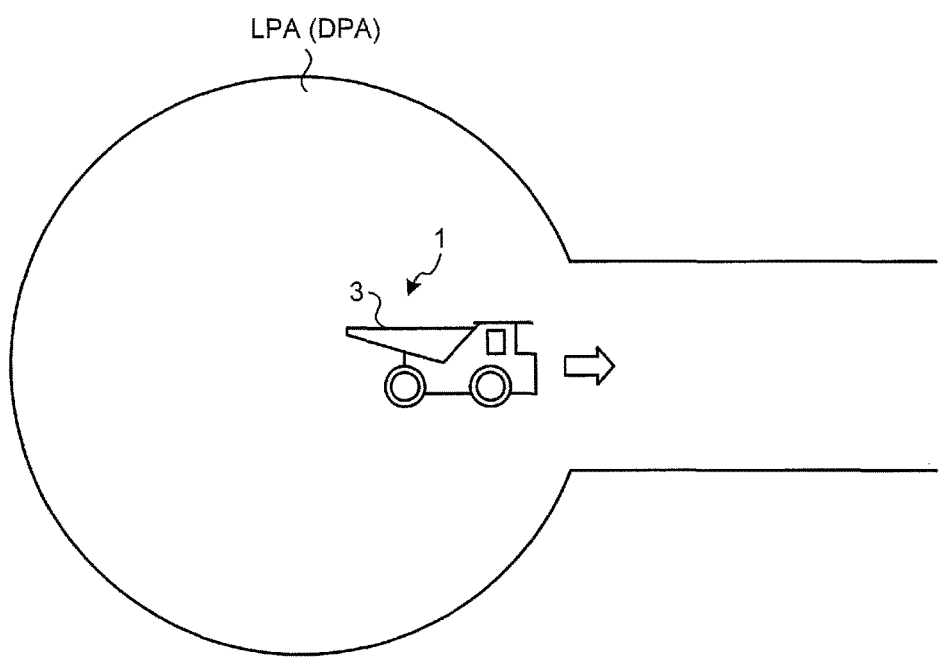
FIG. 9 is a schematic diagram illustrating an example of the operation of the transporter vehicle.

The timing at which the control device 30 acquires the detection result of the loading state detection device 11 may be a timing at which the dump truck 1 starts to move from the loading field LPA or a timing at which the dump truck 1 starts to move from the soil disposal field DPA. That is, as illustrated in FIG. 9, when a load is loaded on the vessel 3 in the loading field LPA of the mine and the dump truck 1 in a loaded state starts to move from the loading field LPA, the control device 30 may acquire the detection result of the loading state detection device 11. When a load is discharged from the vessel 3 in the soil disposal field DPA of the mine and the dump truck 1 in an empty state starts to move from the soil disposal field DPA, the control device 30 may acquire the detection result of the loading state detection device 11.

Figure 10:
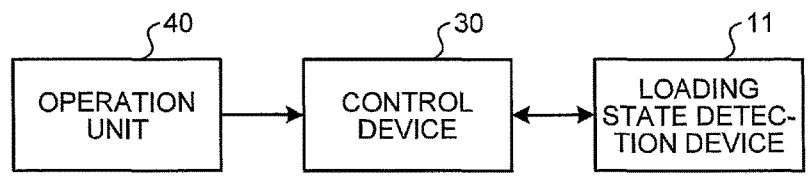
FIG. 10 is a diagram illustrating an example of the control system.

As illustrated in FIG. 10, the timing at which the control device 30 acquires the detection result of the loading state detection device 11 may be determined by the operation of an operation unit 40. The operation unit 40 is disposed near the driver seat 16 inside the cab 8. The operator WM operates the operation unit 40 when the dump truck 1 starts to move from the loading field LPA or the dump truck 1 starts to move from the soil disposal field DPA. When the operation unit 40 is operated, the detection result of the loading state detection device 11 is output to the control device 30. The control device 30 may acquire the detection result of the loading state detection device 11 at the timing at which the operation unit 40 is operated.

For example, a timer 90 provided in the control device 30 detects whether a predetermined time elapses from the timing at which the dump truck 1 starts to move from the loading field LPA or the soil disposal field DPA based on the trigger enabled when the loading state detection device 11 detects the loaded state or the empty state. After the timer 90 measures a state where a predetermined time elapses, the detection result of the loading state detection device 11 may be acquired by the control device 30.

An average value of a plurality of detection values of the loading state detection device 11 detected until a predetermined time elapses from the timing at which the dump truck 1 starts to move from the loading field LPA or the soil disposal field DPA may be acquired by the control device 30 as the detection result in the loaded state.

In the embodiment, the loading state of the load of the vessel 3 includes the state where a load exists in the vessel 3. The control device 30 determines whether a load exists in the vessel 3 (step SA2). The storage unit 34 stores a threshold value for the weight of the load. The control device 30 compares the threshold value with the detection value of the loading state detection device 11. When it is determined that the detection value of the loading state detection device 11 is larger than the threshold value, the control device 30 determines that a load exists in the vessel 3. When it is determined that the detection value of the loading state detection device 11 is equal to or smaller than the threshold value, the control device 30 determines that no load exists in the vessel 3.

Next, the deceleration a of the dump truck 1 (the vehicle 2) is set based on the loading state of the load of the vessel 3 by the variable setting unit 33. The deceleration a of the dump truck 1 is the deceleration (the negative acceleration) of the dump truck 1 when the retarder 28 is operated. In the embodiment, the deceleration a of the dump truck 1 indicates the deceleration of the dump truck 1 when a brake device is operated so that the maximum braking capability of the brake device including the retarder 28 is exhibited. Furthermore, the deceleration a of the dump truck 1 may be a deceleration capable of exhibiting the braking capability in the range where the slip of the dump truck 1 may be suppressed. In general, when the weight of the dump truck 1 is large, the deceleration a is small. When the weight of the dump truck 1 is small, the deceleration a is large. When the deceleration a is small, the traveling dump truck 1 may not easily stop. When the deceleration a is large, the traveling dump truck 1 may easily stop. In the description below, the state where the retarder 28 is operated so that the maximum braking capability of the retarder 28 is exhibited is appropriately referred to as a full brake state.

The weight of the dump truck 1 changes based on the weight of the load loaded on the vessel 3. Accordingly, when the vessel 3 is in an empty state, the weight of the dump truck 1 decreases, and the deceleration a of the dump truck 1 increases (the dump truck 1 may easily stop). When the vessel 3 is in a loaded state, the weight of the dump truck 1 increases, and the deceleration a of the dump truck 1 decreases (the dump truck 1 may not easily stop).

The information on the relation between the weight of the dump truck 1 and the deceleration a of the dump truck 1 of the weight may be obtained in advance by an experiment or a simulation. The storage unit 34 stores the information on the relation between the weight of the load and the deceleration a of the dump truck 1 obtained by an experiment or a simulation.

In the embodiment, the storage unit 34 stores the deceleration a1 of the dump truck 1 in the loaded state and the deceleration a2 of the dump truck 1 in the empty state. The deceleration a2 is larger than the deceleration a1.

When a load is loaded on the vessel 3 in the mining site of the mine, a load may be loaded on the vessel 3 so that the maximum loading capability of the vessel 3 is exhibited from the viewpoint of the improvement in productivity of the mining site. That is, a load of the amount corresponding to 100% of the capacity volume of the vessel 3 is loaded on the vessel 3. For example, the operation in which a load of the amount corresponding to 70% of the capacity volume of the vessel 3 is loaded on the vessel 3 has poor production efficiency and is unusual. That is, in the embodiment, the loaded state of the vessel 3 indicates a state where a load is fully loaded on the vessel 3. For that reason, the deceleration a of the dump truck 1 is sufficient as two values, that is, a deceleration a1 corresponding to the dump truck 1 in the loaded state (the full state) and a deceleration a2 corresponding to the dump truck 1 in the empty state.

In step SA2, when it is determined that a load exists, the variable setting unit 33 sets the deceleration a1 (step SA3). In step SA2, when it is determined that a load does not exist, the variable setting unit 33 sets the deceleration a2 (step SA4).

The traveling state detection device 10 detects the traveling state of the dump truck 1. The detection result of the traveling state detection device 10 is output to the control device 30. The control device 30 acquires the detection result of the traveling state detection device 10.

The traveling speed detection device 10A of the traveling state detection device 10 detects the traveling speed Vt of the dump truck 1, and outputs the detection result to the control device 30. The control device 30 acquires the detection result of the traveling speed detection device 10A (step SA5).

The detection result of the traveling direction detection device 10B and the detection result of the advancing direction detection device 100 are also output to the control device 30. The control device 30 acquires the detection result of the traveling direction detection device 10B and the detection result of the advancing direction detection device 100.

The detection cycle of the traveling state detection device 10 is Gt (for example, a cycle equal to or longer than 1 ms and equal to or shorter than 100 ms). The traveling state detection device 10 continuously outputs the detection result to the control device 30 at a predetermined time interval (the detection cycle) Gt. The control device 30 acquires the detection result. The control device 30 normally monitors the detection result of the traveling state detection device 10 during the operation of the dump truck 1.

The time information used in the determination of the possibility of the collision with the object is calculated based on the detection result of the traveling state detection device 10 by the calculation unit 32. The calculation unit 32 calculates the required stop distance Ds (step SA6). Further, the calculation unit 32 calculates the stop distance passage time Ts based on the traveling speed Vt and the required stop distance Ds (step SA7).

Figure 11:
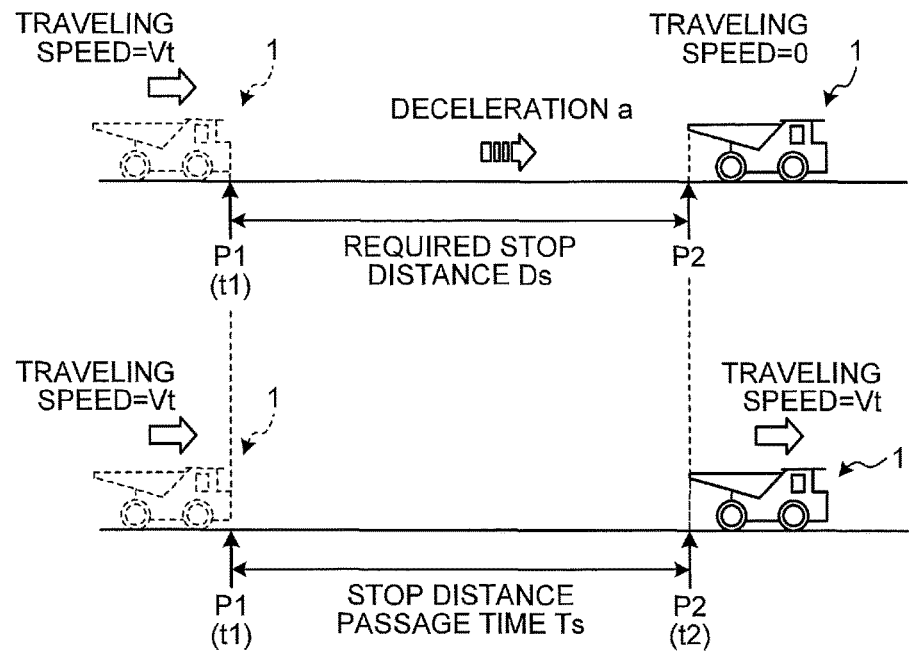
FIG. 11 is a schematic diagram illustrating an example of the operation of the transporter vehicle.

FIG. 11 is a view illustrating the required stop distance Ds and the stop distance passage time Ts. The required stop distance Ds will be described. As illustrated in FIG. 11, in the case where the traveling speed of the dump truck 1 at a first point P1 detected by the traveling state detection device 10 is Vt and the deceleration set by the variable setting unit 33 is a, the dump truck 1 stops at a second point P2 in front of the first point P1 when the retarder 28 is operated in a full brake state when the dump truck 1 is located at the first point P1. At the second point P2, the traveling speed is, of course, 0. The required stop distance Ds is a distance between the first point P1 where the retarder 28 is operated in the full brake state and the second point P2 where the dump truck 1 stops. When the traveling speed of the dump truck 1 at the first point P1 detected by the traveling state detection device 10 is Vt and the deceleration set by the variable setting unit 33 is a, the required stop distance Ds is obtained based on the following equation (1).

$$Ds = Vt(Vt/a) - (1/2)a(Vt/a)^2 = (1/2a)Vt^2 \qquad (1)$$

Accordingly, when the deceleration a1 is set, the following equation is obtained.

$$Ds = (1/2a1)Vt^2 \qquad (1A)$$

When the deceleration a2 is set, the following equation is obtained.

$$Ds = (1/2a2)Vt^2 \qquad (1B)$$

In this way, in the embodiment, the required stop distance Ds between the first point P1 and the second point P2 where the dump truck 1 is stopped is calculated based on the set deceleration a calculated by the variable setting unit 33 and the traveling speed Vt of the dump truck 1 (the vehicle 2) at the first point P1 detected by the traveling state detection device 10.

Next, the stop distance passage time Ts will be described. The stop distance passage time Ts indicates the time from the first time point t1 at which the dump truck 1 exists at the first point P1 to the second time point t2 at which the dump truck reaches the second point P2 when the dump truck travels by the required stop distance Ds at the traveling speed Vt. That is, the stop distance passage time Ts indicates the time necessary for the dump truck 1 to travel by the required stop distance Ds when the dump truck travels by the required stop distance Ds at the constant traveling speed Vt without the operation of the brake device 13 in the state where the dump truck travels at the traveling speed Vt in the first point P1 (the first time point t1). The stop distance passage time Ts is obtained based on the following equation (2).

$$Ts = Ds/Vt \qquad (2)$$

With the above-described configuration, the required stop distance Ds and the stop distance passage time Ts are respectively calculated.

The object detection device 12 detects, for example, the front dump truck 1F. The detection result of the object detection device 12 is output to the control device 30. The control device 30 acquires the detection result of the object detection device 12.

The object detection device 12 includes a radar device, and may detect the front dump truck 1F. The object detection device 12 may detect the relative distance Dr and the relative speed Vr of the front dump truck 1F and the dump truck 1 provided with the object detection device 12. The object detection device 12 detects the relative distance Dr and the relative speed Vr with respect to the front dump truck 1F, and outputs the detection result to the control device 30. The control device 30 acquires the relative distance Dr and the relative speed Vr with respect to the front dump truck 1F (step SA8).

The detection cycle of the object detection device 12 is different from the detection cycle Gt of the traveling state detection device 10. The object detection device 12 continuously outputs the detection result to the control device 30 at a predetermined time interval. The control device 30 acquires the detection result. The control device 30 monitors the detection result of the object detection device 12 at all times during the operation of the dump truck 1.

The calculation unit 32 calculates the time information used in the determination of the possibility of the collision based on the detection result of the object detection device 12. The calculation unit 32 calculates the object arrival time Ta until the dump truck 1 arrives at the front dump truck 1F (step SA9).

Figure 12:
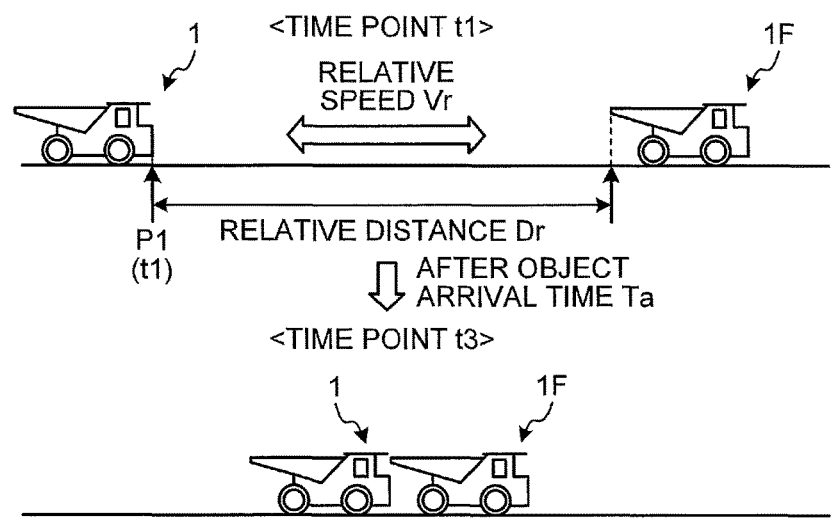
FIG. 12 is a schematic diagram illustrating an example of the operation of the transporter vehicle.

FIG. 12 is a view illustrating the object arrival time Ta. The object arrival time Ta indicates the time taken to the third time point t3 at which the dump truck 1 arrives at the front dump truck 1F when the dump truck travels by the relative distance Dr at the relative speed Vr from the first time point t1 based on the relative distance Dr and the relative speed Vr of the dump truck 1 and the front dump truck 1F at the first point P1 (the first time point t1) detected by the object detection device 12 of the dump truck 1 when the dump truck 1 exists at the first point P1. That is, when the time point at which the relative distance Dr and the relative speed Vr are detected is set as the first time point t1 and the time point at which the dump truck 1 arrives at the front dump truck 1F when the dump truck travels by the relative distance Dr detected at the first time point t1 at the relative speed Vr is set as the third time point t3, the object arrival time Ta indicates the time from the first time point t1 to the third time point t3. The object arrival time Ta is obtained by the following equation (3).

$$Ta = Dr/Vr \qquad (3)$$

In this way, the object arrival time Ta taken until the third time point t3 at which the dump truck 1 arrives at the front dump truck 1F when the dump truck travels by the relative distance Dr at the relative speed Vr from the first time point t1 is calculated based on the relative distance Dr and the relative speed Vr of the dump truck 1 and the front dump truck 1F at the first time point t1 detected by the object detection device 12.

The control device 30 continuously calculates the stop distance passage time Ts and the object arrival time Ta at each of a plurality of points (each of time points) by monitoring the detection value of the traveling state detection device 10 and the detection value of the object detection device 12 at all times. In other words, the control device 30 outputs the stop distance passage time Ts and the object arrival time Ta at each of a plurality of points (each of time points) at a predetermined time interval Gt.

The collision determination unit 31 determines the possibility of the collision between the dump truck 1 and the front dump truck 1F based on the stop distance passage time Ts and the object arrival time Ta (step SA10).

The collision determination unit 31 compares the stop distance passage time Ts with the object arrival time Ta and determines the possibility of the collision based on the comparison result. In the embodiment, the collision determination unit 31 performs the calculation of "Ta−Ts". Based on the result of the calculation of "Ta−Ts", it is estimated whether the dump truck 1 and the front dump truck 1F collide with each other from the first time point t1. The calculation of "Ta−Ts" is performed at a predetermined time interval Gt.

When the calculation result satisfies the relation of "Ta−Ts≤0" (Yes in step SA11), the time taken for the collision between the dump truck 1 and the front dump truck 1F, that is, the object arrival time Ta is estimated as the time equal to the stop distance passage time Ts or the time shorter than the stop distance passage time Ts. In this case, the collision determination unit 31 determines that the possibility of the collision is Level 1 in which the possibility of the collision between the dump truck 1 and the front dump truck 1F is the highest.

When the calculation result satisfies the relation of "α≥Ta−Ts>0" (Yes in step SA13), the time taken for the collision between the dump truck 1 and the front dump truck 1F, that is, the object arrival time Ta is the time slightly longer than the stop distance passage time Ts. In this case, the collision determination unit 31 determines that the possibility of the collision is Level 2 in which the possibility of the collision between the dump truck 1 and the front dump truck 1F is lower than that of Level 1. The numerical value α is a positive value which is set in advance.

When the calculation result satisfies the relation of "Ta−Ts>α" (No in step SA13), the time taken for the collision between the dump truck 1 and the front dump truck 1F, that is, the object arrival time Ta is the time sufficiently longer than the stop distance passage time Ts. In this case, the collision determination unit 31 determines that the possibility of the collision is Level 3 in which the possibility of the collision between the dump truck 1 and the front dump truck 1F is the lowest.

In this way, it is estimated whether the dump truck 1 and the front dump truck 1F collide with each other based on the result of the calculation "Ta−Ts", and the possibility of the collision is determined based on the estimation result. Further, the possibility of the collision (the risk) is classified into a plurality of levels based on the estimation result. In the embodiment, the possibility of the collision is classified into Level 1, Level 2, and Level 3. Among Level 1, Level 2, and Level 3, Level 1 is the level in which the possibility of the collision is the highest, Level 2 is the level in which the possibility of the collision is lower than that of Level 1, and Level 3 is the level in which the possibility of the collision is the lowest.

The collision determination unit 31 determines whether the result of the calculation "Ta−Ts" is Level 1 (Ta−Ts≤0) (step SA11).

In step SA11, when it is determined that the result is Level 1 (Yes in step SA11), the control device 30 controls the retarder 28 (step SA12). The control unit 35 outputs the control signal C4 to the retarder 28. The control unit 35 outputs the control signal C4 to the retarder 28 so that the retarder 28 is operated in the full brake state.

The brake process of the retarder 28 is performed based on the control signal C4 supplied from the control unit 35. Accordingly, the traveling speed of the dump truck 1 is decreased or the dump truck 1 is stopped. Thus, damaged caused by the collision between the dump truck 1 and the front dump truck 1F is reduced.

At Level 1, the control signal C4 takes priority over the operation signal R2 and the operation signal R1. When the control signal C4 is output from the control unit 35 to the retarder 28, the brake process of the retarder 28 is performed based on the control signal C4 regardless of the state where the brake operation unit 25 is operated, the state where the operation amount of the brake operation unit 25 is large or small, the state where the output operation unit 24 is operated, and the state where the operation amount of the output operation unit 24 is large or small. Furthermore, at Level 1, the control signal C4 may take over the operation signal R4.

In step SA11, when it is determined that the result is Level 1, the control unit 35 may output the control signal C1 to the power generation device 22 so that the output of the power generation device 22 is reduced. The output reduction process of the power generation device 22 is performed based on the control signal C1 supplied from the control unit 35. Accordingly, the traveling speed of the dump truck 1 is decreased. Thus, damaged caused by the collision between the dump truck 1 and the front dump truck 1F is reduced.

In this case, at Level 1, the control signal C1 takes over the operation signal R1 and the operation signal R2. When the control signal C1 is output from the control unit 35 to the power generation device 22, the output reduction process of the power generation device 22 is performed based on the control signal C1 regardless of the state where the brake operation unit 25 is operated, the operation amount of the brake operation unit 25 is large or small, the state where the output operation unit 24 is operated, and the state where the operation amount of the output operation unit 24 is large or small. Furthermore, at Level 1, the control signal C1 may take over the operation signal R4.

In step SA11, when it is determined that the possibility of the collision is Level 1, the control unit 35 may output the control signal C4 to the retarder 28 and may output the control signal C1 to the power generation device 22. That is, the output reduction process of the power generation device 22 may be performed along with the brake process of the retarder 28.

In step SA11, when it is determined that the result of the calculation "Ta−Ts" is not Level 1 (Ta−Ts≤0) (No in step SA11), the collision determination unit 31 determines whether the result of the calculation "Ta−Ts" is Level 2 (α≥Ta−Ts>0) (step SA13).

In step SA13, when it is determined that the result is Level 2 (Yes in step SA13), the control device 30 controls the alarm device 21 (step SA14). The control unit 35 outputs the control signal C6 to the alarm device 12. The control unit 35 outputs the control signal C6 to the alarm device 21 so that the alarm device 21 generates an alarm.

Based on the control signal C6 supplied from the control unit 35, the alarm generation process of the alarm device 21 is performed. The alarm device 21 refreshes the attention of the operator WM by generating a sound or light. Thus, an operation for reducing damage caused by the collision is performed by the operator WM. Accordingly, damage caused by the collision between the dump truck 1 and the front dump truck 1F is reduced.

In step SA13, when it is determined that the result is Level 2, the control unit 35 may output the control signal C5 to the display device 20. Based on the control signal C5 supplied from the control unit 35, the display process of the display device 20 is performed. Thus, an operation for reducing damage caused by the collision is performed by the operator WM.

In step SA13, when it is determined that the result is Level 2, the control unit 35 may output the control signal C2 so that the brake device 13 is operated. For example, the brake process of the brake device 13 may be performed so that a braking force smaller than the braking force in the full brake state is generated based on the control signal C2 supplied from the control unit 35. Alternatively, in step SA13, when it is determined that the result is Level 2, the control unit 35 outputs the control signal C4 so that the retarder 28 is operated, but the brake process of the retarder 28 may be performed so that a braking force smaller than the braking force in the full brake state is generated.

In the description below, a state where the retarder 28 is operated so as to generate a braking force smaller than the braking force of the full brake state will be appropriately referred to as a weak brake state or a pre-brake state.

In step SA13, when it is determined that the result is Level 2, the control unit 35 may output the control signal C1 so that the output of the power generation device 22 is reduced. Based on the control signal C1 supplied from the control unit 35, the output reduction process of the power generation device 22 is performed.

In step SA13, when it is determined that the result of the calculation "Ta–Ts" is not Level 2 ($\alpha \geq Ta-Ts > 0$) (No in step SA13), the collision determination unit 31 determines that the result of the calculation "Ta–Ts" is Level 3 (Ta–Ts>$\alpha$).

When it is determined that the result is Level 3, a process for reducing damage caused by the collision is not performed by the process system 600. The control system 300 returns the routine to step SA5, and repeats the above-described series of processes. For example, the control device 30 continuously monitors the detection result of the traveling state detection device 10 and the detection result of the object detection device 12 at all times.

In step SA12, when the retarder 28 is controlled and that the traveling speed Vt of the dump truck 1 is decreased so that the possibility of the collision is decreased, the output of the control signal C4 from the control unit 35 to the retarder 28 is stopped. Thus, the control of the retarder 28 by the control device 30 is not performed. The control system 300 returns the routine to step SA5, and repeats the above-described series of processes.

In step SA14, when the alarm device 21 is controlled and the traveling speed Vt of the dump truck 1 is decreased by, for example, any one of the operations of the brake operation unit 25, the retarder operation unit 17, and the output operation unit 24 by the operator WM so that the possibility of the collision is decreased, the output of the control signal C6 from the control unit 35 to the alarm device 21 is stopped. Thus, the control of the alarm device 21 by the control device 30 is not performed. The control system 300 returns the routine to step SA5, and repeats the above-described series of processes.

In at least one of step SA11 and step SA13, when it is determined that the possibility of the collision is Level 1 or Level 2, the control unit 35 may output a control signal C3 to the steering device 14 in order to reduce the damage caused by the collision between the dump truck 1 and the front dump truck 1F. When the front dump truck 1F exists on the road of the dump truck 1, the traveling direction of the dump truck 1 may be changed by performing a process of changing the traveling direction of the steering device 14 so that the front dump truck 1F is not disposed on the road of the dump truck 1.

At Level 1, the control signal C3 may take priority over the operation signal R3. When the control signal C3 is output from the control unit 35 to the steering device 14, the steering device 14 performs the traveling direction change process based on the control signal C3 regardless of the state where the traveling direction operation unit 15 is operated and the state where the operation amount of the traveling direction operation unit 15 is large or small.

In the embodiment, in step SA5, not only the detection result of the traveling speed detection device 10A, but also the detection result of the traveling direction detection device 10B and the detection result of the advancing direction detection device 100 are also output to the control device 30. For example, when it is determined that the traveling direction of the dump truck 1 changes so that the front dump truck 1F is deviated from the traveling road of the dump truck 1 based on the detection result of the traveling direction detection device 10B even when the object detection device 12 detects the front dump truck 1F, the control device 30 may determine that the possibility of the collision is low (Level 3). In that case, a process for reducing damage caused by the collision may not be performed by the process system 600.

When the dump truck 1 moves backward, there is a low possibility that the dump truck 1 and the front dump truck 1F may collide with each other. For that reason, when it is determined that the dump truck 1 moves backward based on the detection result of the advancing direction detection device 10C, a process for reducing damage caused by the collision may not be performed by the process system 600.

In the embodiment, when it is determined that the possibility of the collision is Level 2, the operation signal R1 may take priority over the control signal C1. For example, when both the operation signal R1 and the control signal C1 are supplied to the power generation device 22, the power generation device 22 may be driven based on the operation signal R1. Further, when it is determined that the possibility of the collision is Level 2, the operation signal R2 may take priority over the control signal C2. For example, when both the operation signal R2 and the control signal C2 are supplied to the brake device 13, the brake device 13 may be driven based on the operation signal R2. Further, when it is determined that the possibility of the collision is Level 2, the operation signal R3 may take priority over the control signal C3. For example, when both the operation signal R3 and the control signal C3 are supplied to the steering device 14, the steering device 14 may be driven based on the operation signal R3. That is, when the possibility of the collision is Level 2 or Level 3, the operation by the driver WM may take priority.

Furthermore, in the embodiment, the level of the possibility of the collision is classified into three levels (Level 1, Level 2, and Level 3). The level of the possibility of the collision may be classified into a plurality of levels of four levels or more. The level of the possibility of the collision may be classified into two levels (Level 1 and Level 2). That is, the level of the possibility of the collision may be classified into two levels such as the level without the possibility of the collision and the level with the possibility of the collision. In such a case, if the operation signal R is generated when the driver WM operates any operation unit while the control signal C is output from the control device 30, the operation signal R may take priority at the level without the possibility of the collision, and the control signal C may take priority over the operation signal R at the level with the possibility of the collision. Alternatively, when the possibility of the collision is classified into two levels, that is, the level without the possibility of the collision and the level with the possibility of the collision, the operation signal R may take priority when a predetermined condition is established even when the control signal C is output from the control device 30 at the level with the possibility of the collision. For example, when a predetermined condition is established in which the driver WM operates any operation device (an operation unit) to generate the operation signal R while the control signal C is output from the control device 30, the operation signal R may take priority at the level with the possibility of the collision.

(Data Output)

As described above, in the embodiment, the control unit 35 outputs the control signal C for reducing the damage caused by the collision to the process system 600 based on the determination result of the collision determination unit 31. The data acquisition unit 36 acquires the time point data in which the control signal C is output from the control unit 35 from the timer 90. In other words, the data acquisition unit 36 acquires the time point data in which the process system 600 performs a process for reducing the damage caused by the collision from the timer 90. The time point data is, for example, data including a date and a time. For example, the time point data is data that specifies the date of 1, 8, 2014 and data that specifies the time of 14:53:30.

Furthermore, the time point data may be data only including a month and a day, data only including a time, data only including a date, data only including a month, a day, and a time, or data including a date and a time.

In the embodiment, the monitor device 95 correlates the time point data in which the control signal C is output from the control unit 35 with the process history data which indicates the process state of the process system 600 and stores the correlation result in the storage unit 95A. Further, the monitor device 95 correlates the time point data in which the control signal C is output from the control unit 35 with the process history data which indicates the process state of the process system 600 and outputs the correlation result from the output unit 95B.

The process history data includes data that indicates the process state of the process system 600. The process history data that indicates the process state of the process system 600 indicates at least one of the existence of the process of the process system 600 and the process content of the process system 600 and both the existence of the process of the process system 600 and the process content of the process system 600. The data which indicates the existence of the process of the process system 600 is data which indicates whether the process system 600 is operated (a process is performed). The data which indicates the process content of the process system 600 is data which indicates the process content when the process is performed by the process system 600. The correlation between the time point data and the process history data includes at least one of the correlation between the time point data and the existence of the process, the correlation between the time point data and the process content, and the correlation among the time point data, the existence of the process, and the process content.

In the embodiment, the data output from the output unit 95B includes the data which is output to the outside of the dump truck 1 (the monitor device 95). The output unit 95B may output the data in a wireless manner or may output the data in a wired manner. Further, the data output from the output unit 95B includes the data which is output to an output device (for example, a printing device or a display device) which is provided outside the dump truck 1.

Further, in the embodiment, the data output from the output unit 95B includes the data which is output into the dump truck 1. The data output into the dump truck 1 includes the data which is output to a device such as the display device 20 of the dump truck 1.

Figures 13, 14:
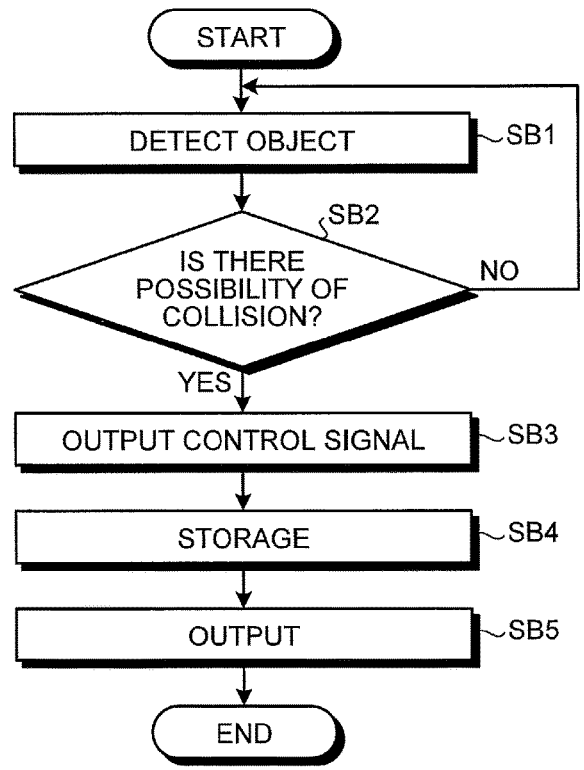
FIG. 13 is a diagram illustrating an example of process history data.
FIG. 14 is a flowchart illustrating an example of a transporter vehicle control method.

FIG. 13 is a diagram illustrating an example of the process history data which is stored or output by the monitor device 95. In the embodiment, the output unit 95B outputs at least the process history data. As illustrated in FIG. 13, the output unit 95B may output data different from the process history data. As illustrated in FIG. 13, a result is stored or output so that the data of the time including the month and the day or the data (the time point data) including only the time in which the control signal C for reducing the damage caused by the collision is output from the control unit 35 is correlated with the process state (the process history data) of the process system 600. In the example illustrated in FIG. 13, a result is stored or output so that the time point (the time point data) in which the control signal C is output from the control unit 35 is correlated with the process content (the process history data) of the process system 600 based on the control signal C. As described above, the time point (the time point in which the process of the process system 600 is performed) in which the control signal C is output from the control unit 35 is a time point in which the collision determination unit 31 determines that there is a possibility of the collision.

Furthermore, as described above, the process history data includes not only the process content of the process system 600, but also the existence of the process of the process system 600. The existence of the process of the process system 600 may be stored or output while being correlated with the time point data.

As described above, in the embodiment, the determination of the collision determination unit 31 includes a case in which the possibility of the collision is classified into a plurality of levels (Level 1, Level 2, and Level 3). The control unit 35 outputs the control signal C to the specific process device (the alarm device 21, the retarder 28, the brake device 13, and the power generation device 22) based on the level. Further, the control unit 35 adjusts the operation state (the full brake state or the weak brake state) of the brake device including the retarder 28 and the brake device 13 based on the level (the collision possibility level) of the possibility of the collision.

As illustrated in FIG. 13, the monitor device 95 may store or output not only the process history data, but also the collision possibility level (the collision possibility level data) output from the collision determination unit 31 so that the process history data and the collision possibility level are correlated with the time point data.

For example, when the alarm device 21 is operated due to the state in which the collision possibility level becomes Level 2 at 13:15:17 on August 1 (due to the approach with respect to the precedent vehicle), the monitor device 95 stores or outputs "Level 2" as the collision possibility level (the collision possibility level data) and the "alarm" as the process content (the process history data) so that the collision possibility level and the process content are correlated with "13:15:17 on August 1" as the generation time point (the generation time point data).

Similarly, for example, when the brake device is operated so that the brake state becomes the full brake state due to the state in which the collision possibility level becomes Level 1 at 09:30:25 on August 20 (due to the approach with respect to the precedent vehicle), the monitor device 95 stores or outputs "Level 1" as the collision possibility level (the collision possibility level data) and the "full brake" as the process content (the process history data) so that the collision possibility level and the process content are correlated with "09:30:25 on August 20" as the generation time point (the generation time point data).

(Control Method)

Next, an example of a method of controlling the dump truck 1 according to the embodiment will be described with reference to the flowchart of FIG. 14.

The object at the front side of the dump truck 1 is detected by the object detection device 12 provided in the dump truck 1 (step SB1).

The collision determination unit 31 determines the possibility of the collision between the dump truck 1 and the object based on the detection result of the object detection device 12 (step SB2).

In step SB2, when it is determined that the possibility of the collision does not exist (step SB2: No), the process of the object detection device 12 is continued.

In step SB2, when it is determined that the possibility of the collision exists (step SB2: Yes), the control unit 35 outputs the control signal C for reducing the damage caused by the collision to the process system 600 (step SB3).

For example, when it is determined that the collision possibility level is Level 1, the control unit 35 outputs the control signal C to the brake device so that the brake state becomes the full brake state. When it is determined that the collision possibility level is Level 2, the control unit 35 outputs the control signal C to the brake device so that the brake state becomes the weak brake state.

The monitor device 95 correlates the time point data (the time) in which the control signal C is output from the control unit 35 with the process history data (the process content) of the process system and stores the correlation result in the storage unit 95A (step SB4).

The monitor device 95 correlates the time point data (the time) in which the control signal C is output from the control unit 35 with the process history data (the process content) of the process system and outputs the correlation result from the output unit 95B (step SB5). The output unit 95B may output at least the process history data.

Figure 15:
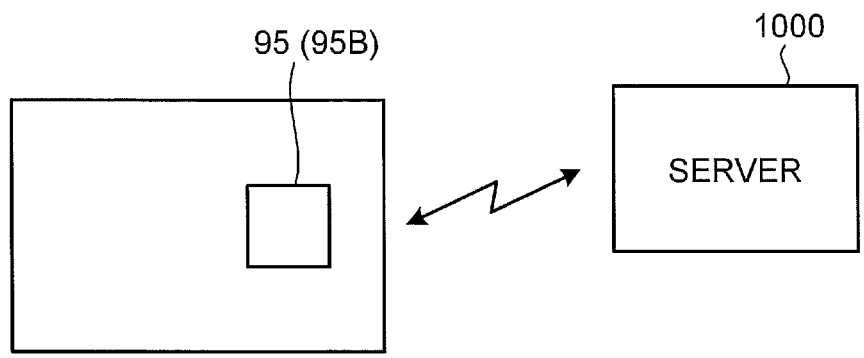
FIG. 15 is a schematic diagram illustrating an example of an operation of an output unit.

FIG. 15 is a schematic diagram illustrating an example of the operation of the output unit 95B. As illustrated in FIG. 15, the output unit 95B may output not only the process history data, but also data different from the process history data. The output unit 95B includes a communication unit used for the wireless communication of the process history data correlated with the time point data. The output unit 95B outputs at least the process history data to the external device in a wireless manner. In the example illustrated in FIG. 15, the external device includes a server 1000. The server 100 accumulates and stores the process history data.

Furthermore, the timing in which the process history data is output to the external device may be a predetermined time point (a predetermined time), a time point in which the creation of the process history data is completed, or a time point in which a predetermined number of the process history data is accumulated. For example, the predetermined time may a time at night or a periodic time. For example, the process history data may be output on time at night.

Furthermore, the timing in which the process history data is output to the external device may be set based on the collision possibility level. For example, if the process history data is created when the collision possibility level is Level 1, the process history data may be output to the external device at the time point in which the creation of the process history data is completed. If the process history data is created when the collision possibility level is Level 2 or Level 3, the process history data may be output at a predetermined time or a time point in which a predetermined number of the process history data is accumulated. Alternatively, the process history data may be output to the external device at the time point in which the process history data is created regardless of the level of the possibility of the collision.

(Action)

As described above, according to the embodiment, the dump truck 1 includes the process system 600 capable of performing a process for reducing damage caused by the collision, and the control signal C for reducing damage caused by the collision is output from the control unit 35 to the process system 600 based on the determination result of the collision determination unit 31. Accordingly, it is possible to reduce damage caused by the collision between the dump truck 1 and the front dump truck 1F.

According to the embodiment, since the time point data in which the control signal C for reducing the damage caused by the collision is output from the control unit 35 and the process history data which indicates the process state of the process system 600 are stored and output while being correlated with each other, the manager of the dump truck 1 may recognize the time point in which the process system 600 is operated based on the process history data. Accordingly, the manager may recognize a state where the collision between the dump truck 1 and the object may occur. Thus, the manager may prepare a prevention measure or an improvement plan so that the collision between the dump truck 1 and the object does not occur by using the process history data (statistical data). For example, when it is determined that the number of the process history data at the night time is larger than that of the day time so that the possibility of the collision is high at the night time, a prevention measure or an improvement plan is prepared in which more night illumination devices are provided in the mine, the working form of the driver WM that drives the dump truck 1 at the night time is re-examined, the rule of the maximum speed at the night time is re-examined, or the operation plan of the dump truck 1 at the night time is re-examined. That is, the operation of the dump truck 1 in the entire mine may be managed or the labor of the driver WM may be appropriately managed. In this way, according to the embodiment, it is possible to prepare an improvement measure and a prevention measure for reducing the damage caused by the collision by using the process history data.

In the embodiment, the process system 600 includes a plurality of process devices capable of performing different processes. For that reason, the control unit 35 may output the control signal C to an appropriate (specific) process device capable of reducing damage caused by the collision and suppressing degradation in the work efficiency among the plurality of process devices based on the determination result of the collision determination unit 31.

In the embodiment, the determination of the possibility of the collision of the collision determination unit 31 includes a case in which the possibility of the collision is classified into a plurality of levels. The control unit 35 outputs the control signal C to a specific process device among a plurality of process devices based on the level. In the embodiment, since the control signal C2 is output to the brake device 13 at Level 1 in which the possibility of the collision (the risk) is high, the collision may be prevented. Since the control signal C6 is output to the alarm device 21 at Level 2 in which the possibility of the collision is comparatively low, degradation in work efficiency may be suppressed. In this way, since an appropriate process device is selected from a plurality of process devices based on the level of the possibility of the collision and a process for reducing the damage caused by the collision is performed by using the selected process device, the damage caused by the collision may be reduced, and degradation in work efficiency may be suppressed.

According to the embodiment, since the process history data is correlated with the collision possibility level, the manager may more specifically check the operation state of the process system. Accordingly, it is possible to more appropriately prepare an improvement measured and a prevention measure for reducing the damage caused by the collision.

According to the embodiment, the output unit 95B includes a communication unit used for the wireless communication of at least the process history data. The output unit 95B may be also used for the wireless communication of the time point data or the collision possibility level data correlated with the process history data. By the wireless communication, at least the process history data is output from the output unit 95B to the external device. For example, the external device may be the server 1000 of an office where the manager of the dump truck 1 exists, a personal computer, or a mobile terminal carried by the manager. Accordingly, the manager may acquire at least the process history data at a place separated from the site called the mine. As described above, the manager may acquire the process history data or the like at a predetermined timing. Thus, the manager may promptly perform a prevention measure or an improvement plan so that the collision between the dump truck 1 and the object does not occur.

According to the embodiment, since the possibility of the collision (the crash) between the dump truck 1 and the front dump truck 1F is determined in consideration of the loading state of the load of the vessel 3, it is possible to suppress degradation in the production efficiency of the mine or degradation in the work efficiency of the dump truck 1 while reducing damage caused by the collision with the front dump truck 1F. The dump truck 1 in the empty state has a weight slightly lighter than the dump truck 1 in the loaded state, and has a high traveling performance. The traveling performance of the dump truck 1 includes at least one of the driving performance, the braking performance, and the turning performance. The dump truck 1 in the empty state having a high traveling performance may sufficiently perform a process for reducing damage caused by the collision with the object by the process system 600 compared to the dump truck 1 in the loaded state having a low traveling performance. When the traveling operation of the dump truck 1 in the empty state having a high traveling performance is limited based on the dump truck 1 in the empty state having a low traveling performance in order to reduce damage caused by the collision, the traveling operation of the dump truck 1 in the empty state is excessively limited. As a result, there is a possibility that the work efficiency of the dump truck 1 may be degraded. For example, when the traveling operation is excessively limited, the traveling speed is decreased or the traveling operation is stopped in the dump truck 1 in the empty state although there is no need to decrease the traveling speed or stop the traveling operation. According to the embodiment, since the possibility of the collision (the crash) with the front dump truck 1F is determined in consideration of the loading state of the load of the vessel 3 having a large influence on the traveling performance of the dump truck 1, it is possible to suppress a problem in which the traveling operation of the dump truck 1 in the empty state is excessively limited while damage caused by the collision is reduced. Further, since the traveling operation of the dump truck 1 in the loaded state is appropriately limited, damage caused by the collision is reduced. Accordingly, even when the loading state of the load of the vessel 3 changes, the dump truck 1 may be operated with high work efficiency while reducing damage caused by the collision.

In the embodiment, the deceleration a of the dump truck 1 is obtained as the variable changed based on the loading state of the load of the vessel 3, the time until the dump truck 1 and the front dump truck 1F collide with each other is estimated based on the deceleration a, and the possibility of the collision is determined. In the embodiment, the collision determination unit 31 estimates the time until the dump truck 1 collides with the front dump truck 1F based on the stop distance passage time Ts and the object arrival time Ta. The stop distance passage time Ts is obtained based on the deceleration a of the dump truck 1 set by the variable setting unit 33 and the traveling speed Vt of the dump truck 1 detected by the traveling state detection device 10. The object arrival time Ta is obtained based on the detection result of the object detection device 12. The collision determination unit 31 may estimate whether the collision with the front dump truck 1F occurs based on the deceleration a set by the variable setting unit 33, the detection result of the traveling state detection device 10, and the detection result of the object detection device 12. Thus, the possibility of the collision may be reliably determined.

According to the embodiment, since the stop distance passage time Ts and the object arrival time Ta are calculated and the possibility of the collision is determined based on the stop distance passage time Ts and the object arrival time Ta, the possibility of the collision may be reliably determined.

Furthermore, in the embodiment, the storage unit 34 is provided which stores the time point data and the process history data while having a correlation therebetween. The storage unit 34 which stores the time point data and the process history data while having a correlation therebetween may be omitted. For example, when the timing in which the process history data is output to the external device is determined at the time point in which the completion of the process history data is completed, the storage unit 34 may be omitted. The same applies to the embodiment below.

<Second Embodiment>

A second embodiment will be described. In the description below, the same reference numerals will be given to the same or equivalent components as or to the above-described embodiment, and the description thereof will be simplified or omitted.

FIG. 16 is a diagram illustrating an example of the process history data which is stored in or output from the monitor device 95. As illustrated in FIG. 16, the time point data in which the control signal C is output from the control unit 35, the process history data of the process system 600, and the position data of the dump truck 1 at the time point in which the control signal C is output from the control unit 35 are stored or output while having a correlation thereamong. The output unit 95B may output at least the time point data, the process history data, and the position data.

The correlation between the position data and the process history data includes at least one of the correlation between the position data and the existence of the process, the correlation between the position data and the process content, and the correlation among the position data, the existence of the process, and the process content.

The position data may be used to specify the place of the traveling road on which the dump truck 1 travels, and may be the name of the place or the numerical data of the latitude, the longitude, and the like. Further, the position data may be a numerical data in which the numerical data thereof is converted in the coordinate defined in the mine based on the numerical data of the latitude, the longitude, and the like. The data of the altitude may be included in the numerical data of the latitude, the longitude, and the like. Furthermore, when the position detection device 91 normally obtains the position data at a predetermined period and the control unit 35 outputs the control signal C, the position data which is acquired by the position detection device 91 may be stored or output at the timing corresponding to the time point. Alternatively, the position detection device 91 may be operated only in the case where the control signal C is output from the control unit 35, and the measured position data may be stored or output.

Further, the time point data in which the control signal C is output from the control unit 35, the process history data of the process system 600, and the vehicle identification data of the dump truck 1 at the time point in which the control signal C is output from the control unit 35 are stored or output while having a correlation thereamong.

Further, the time point data in which the control signal C is output from the control unit 35, the process history data of the process system 600, and the driver identification data of the driver WM of the dump truck 1 at the time point in which the control signal C is output from the control unit 35 are stored or output while having a correlation thereamong.

Further, the time point data in which the control signal C is output from the control unit 35, the process history data of the process system 600, and the traveling state data of the dump truck 1 at the time point in which the control signal C is output from the control unit 35 are stored or output while having a correlation thereamong. Furthermore, in the example illustrated in FIG. 16, the traveling speed data is stored or output as the traveling state data. The traveling direction data and the advancing direction data may be stored or output.

Further, the time point data in which the control signal C is output from the control unit 35, the process history data of the process system 600, and the loaded state data of the load of the dump truck 1 at the time point in which the control signal C is output from the control unit 35 are stored or output while having a correlation thereamong. Furthermore, in the example illustrated in FIG. 16, a load existence data is stored or output as the loaded state data of the load. Further, the load weight data may be stored or output as the loaded state data.

Since the process history data is correlated with the position data, the manager of the dump truck 1 may recognize the position of the dump truck 1 in which the process system 600 is operated in the mining site of the mine. Accordingly, the manager may estimate the position in which the possibility of the collision between the dump truck 1 and the object is high. Thus, the manager may prepare the prevention measure or the improvement plan so that the collision between the dump truck 1 and the object does not occur by using the process history data (statistical data) correlated with the position data. For example, when it is determined that the possibility of the collision in high at the intersection point or the slope (hereinafter, referred to as a predetermined position) in the mining site, the operation of the dump truck 1 in the entire mine may be appropriately managed and the labor of the driver WM may be appropriately managed by changing the traveling road HL of the dump truck 1, re-examining the design of the traveling road HL of the mine, repairing the traveling road HL of the predetermined position, re-examining the rule of the maximum speed of the predetermined position, or refreshing the attention of the driver WM of the dump truck 1 traveling at the predetermined position.

Since the process history data is correlated with the vehicle identification data, the manager of the dump truck 1 may specify the dump truck 1 in which the process history data is generated or the dump truck 1 in which the process system 600 is operated based on the process history data, the vehicle identification data, and the designed operation plan. Accordingly, the manager may estimate the dump truck 1 having a high possibility of the collision with the object. Thus, the manager may prepare a prevention measure or an improvement plan so that the collision between the dump truck 1 and the object does not occur by using the process history data (statistical data) correlated with the vehicle identification data. For example, the operation of the dump truck 1 in the entire mine may be appropriately managed and the labor of the driver WM may be appropriately managed by refreshing the attention of the driver WM that drives the dump truck 1 which is determined as the dump truck 1 having a high possibility of the collision.

Since the process history data is correlated with the driver identification data, the manager of the dump truck 1 may specify the driver WM that drives the dump truck 1 in which the process history data is generated or the driver WM that drives the dump truck 1 in which the process system 600 is operated based on the process history data and the driver identification data. Accordingly, the manager may recognize the driver WM who is estimated that this driver has a high possibility of the collision with the object. Thus, the manager may prepare a prevention measure or an improvement plan so that the collision between the dump truck 1 and the object does not occur by using the process history data (statistical data) correlated with the driver identification data. For example, when it is estimated that the operation of a certain driver WM has a high possibility of the collision, the manager may ask the driver WM to take a rest or to safely drive the dump truck. Further, for example, when the more process history data is generated at the night time compared to the day time as the result of the operation of the driver WM and hence the possibility of the collision is high at the night time, the manager may ask the driver WM to work at the day time. Alternatively, the manager may shorten the working hours of the driver WM. In this way, the operation of the dump truck 1 in the entire mine may be appropriately managed and the labor of the driver WM may be appropriately managed.

Since the process history data is correlated with the traveling state data of the dump truck 1, the manager of the dump truck 1 may recognize the traveling state of the dump truck 1 in which the process system 600 is operated.

Accordingly, the manager may recognize the traveling state of the dump truck 1 having a high possibility of the collision with the object. Thus, the manager may prepare a countermeasure for suppressing the collision between the dump truck 1 and the object by using the process history data (statistical data) correlated with the traveling state data. For example, when it is determined that there is a high possibility of the collision when the dump truck 1 travels at a certain traveling speed or more, the manager may ask the driver WM of the dump truck 1 to keep the speed limit. Alternatively, for example, the design of the traveling road HL may be changed so as to gently adjust the inclination of the downhill in which the traveling speed easily increases from the traveling state data. In this way, the operation of the dump truck 1 in the entire mine may be appropriately managed and the labor of the driver WM may be appropriately managed.

Since the process history data is correlated with the traveling state data of the dump truck 1, the manager of the dump truck 1 may recognize the loaded state of the dump truck 1 in which the process system 600 is operated. Accordingly, the manager may recognize the loaded state of the dump truck 1 having a high possibility of the collision with the object. Thus, the manager may prepare a prevention measure or an improvement plan so that the collision between the dump truck 1 and the object does not occur by using the process history data (statistical data) correlated with the traveling state data. For example, when the loaded state data indicates the non-existence of the load and is correlated with the process history data, the manager may refresh the attention of the driver WM so that the driver does not increase the speed too much or carefully watches the front object when the dump truck moves from the soil disposal field DPA to the loading field LPA, that is, the dump truck travels without a load. For example, when the loaded state data indicates the overloaded state and is correlated with the process history data based on the load weight data, the manager may ask the driver WM of the dump truck 1 to keep the limited loading amount. In this way, the operation of the dump truck 1 in the entire mine may be appropriately managed and the labor of the driver WM may be appropriately managed.

The output unit 95B may output the time point data, the position data, and the process history data while having a correlation thereamong. Alternatively, the output unit 95B may output the time point data and the process history data while having a correlation therebetween without the correlation with the position data. Alternatively, the output unit 95B may output the position data and the process history data while having a correlation therebetween without the correlation with the time point data. The output unit 95B may output the time point data in which the signal is output from the control unit 35 and the process history data which indicates the process state of the process system 600 while having a correlation therebetween. The output unit 95B may output the position data of the dump truck 1 in which the signal is output from the control unit 35 and the process history data which indicates the process state of the process system 600 while having a correlation therebetween.

As described above, the process history data which indicates the process state of the process system 600 indicates any one of the existence of the process of the process system 600, the process content of the process system 600, and both of the existence of the process of the process system 600 and the process content of the process system 600.

The correlation between the time point data and the process history data includes at least one of the correlation between the time point data and the existence of the process, the correlation between the time point data and the process content, and the correlation among the time point data, the existence of the process, and the process content.

The correlation between the position data and the process history data includes at least one of the correlation between the position data and the existence of the process, the correlation between the position data and the process content, and the correlation among the position data, the existence of the process, and the process content.

The correlation among the time point data, the position data, and the process history data includes at least one of the correlation among the time point data, the position data, and the existence of the process, the correlation among the time point data, the position data, and the process content, and the correlation among the time point data, the position data, the existence of the process, and the process content.

Furthermore, in the above-described embodiments, the vehicle body 5 of the dump truck 1 is classified into the front part and the rear part, and an articulate dump truck of which the front part and the rear part are coupled to each other by free joints may be used.

Furthermore, in the above-described embodiments, the dump truck 1 may be used not only in the mining site of the mine, but also, for example, the construction site of the dam.

REFERENCE SIGNS LIST

1 DUMP TRUCK (TRANSPORTER VEHICLE)
2 VEHICLE
2F FRONT PART
2R REAR PART
3 VESSEL
4 TRAVELING DEVICE
5 VEHICLE BODY
5A LOWER DECK
5B UPPER DECK
5C LADDER
5D LADDER
6 VEHICLE WHEEL
6F FRONT WHEEL
6R REAR WHEEL
7 AXLE
7F AXLE
7R AXLE
8 CAB
9 SUSPENSION CYLINDER
9F SUSPENSION CYLINDER
9R SUSPENSION CYLINDER
10 TRAVELING STATE DETECTION DEVICE
10A TRAVELING SPEED DETECTION DEVICE
10B TRAVELING DIRECTION DETECTION DEVICE
10C ADVANCING DIRECTION DETECTION DEVICE
11 LOADING STATE DETECTION DEVICE
12 OBJECT DETECTION DEVICE
13 BRAKE DEVICE
14 STEERING DEVICE
16 DRIVER SEAT
15 TRAVELING DIRECTION OPERATION UNIT
17 RETARDER OPERATION UNIT
18 SPEED STAGE OPERATION UNIT
19 TRAINER SEAT
20 DISPLAY DEVICE
21 ALARM DEVICE
22 POWER GENERATION DEVICE
24 OUTPUT OPERATION UNIT
25 BRAKE OPERATION UNIT

28 RETARDER
29 VEHICLE CONTROL DEVICE
30 CONTROL DEVICE
31 COLLISION DETERMINATION UNIT
32 CALCULATION UNIT
33 VARIABLE SETTING UNIT
34 STORAGE UNIT
35 CONTROL UNIT
36 DATA ACQUISITION UNIT
40 OPERATION UNIT
80 SPEED CHANGE DEVICE
90 TIMER
91 POSITION DETECTION DEVICE
92 VEHICLE IDENTIFICATION DATA OUTPUT UNIT
93 DRIVER IDENTIFICATION DATA OUTPUT UNIT
95 MONITOR DEVICE
95A STORAGE UNIT
95B OUTPUT UNIT
300 CONTROL SYSTEM
300S COLLISION DAMAGE REDUCTION SYSTEM
400 STATE QUANTITY DETECTION SYSTEM
500 TRAVELING CONDITION ADJUSTMENT SYSTEM
600 PROCESS SYSTEM
1000 SERVER
DPA SOIL DISPOSAL FIELD
HL TRAVELING ROAD
LM LOADING MACHINE
LPA LOADING FIELD
SL DETECTION AREA
WM DRIVER

The invention claimed is:

1. A dump truck comprising:
a vessel;
an object detection device that detects an object at a front side of the dump truck;
a collision determination unit that determines a possibility of a collision with the object based on a detection result of the object detection device;
a process system that performs a process for reducing damage caused by the collision, the process system including a plurality of process devices which are configured to perform different processes from each other for reducing the damage caused by the collision and which include an alarm device configured to perform an alarm generation process and a brake device configured to perform a brake process on a traveling device of the dump truck;
a control unit that outputs a signal for reducing the damage caused by the collision to the process system based on a determination result of the collision determination unit;
a time point data acquisition unit that acquires time point data at a time point in which the signal is output from the control unit;
a position data acquisition unit that acquires position data of the dump truck at the time point in which the signal is output from the control unit;
a loaded state data acquisition unit that acquires a loaded state data of a load of the vessel of the dump truck at the time point in which the signal is output from the control unit; and
an output unit that outputs process history data indicating at least a process state of the alarm generation process and the brake process performed by the process system which is process content of the process for reducing damage caused by the collision by the process system, wherein the dump truck travels on a loading field, a soil disposal field, and a traveling road connected to the loading field and the soil disposal field in a mining site of a mine, wherein the output unit outputs, to an external device, the loaded state data, the time point data, the position data, and the process history data in association with each other.

2. The dump truck according to claim 1, further comprising:
a storage unit that stores the time point data in which the signal is output from the control unit and the process history data in association with each other.

3. The dump truck according to claim 1, further comprising:
a storage unit that stores the position data of the dump truck and the process history data in association with each other.

4. The dump truck according to claim 1, further comprising:
a vehicle identification data acquisition unit that acquires identification data of the dump truck outputting the signal from the control unit,
wherein the process history data is associated with the vehicle identification data.

5. The dump truck according to claim 1, further comprising:
a driver identification data acquisition unit that acquires identification data of a driver of the dump truck outputting the signal from the control unit,
wherein the process history data is associated with the driver identification data.

6. The dump truck according to claim 1, further comprising:
a traveling state data acquisition unit that acquires a traveling state data of the dump truck outputting the signal from the control unit,
wherein the process history data is associated with the traveling state data.

7. The dump truck according to claim 1, wherein the control unit outputs the signal to a specific process device from the plurality of process devices based on the determination result of the collision determination unit.

8. The dump truck according to claim 7,
wherein the determination of the collision determination unit includes a case in which the possibility of the collision is classified into a plurality of levels, and
wherein the control unit outputs the signal to the specific process device based on the level.

9. The dump truck according to claim 7,
wherein the process devices further include a power generation device configured to perform an output reduction process for reducing a driving force for the traveling device of the dump truck.

10. The dump truck according to claim 1,
wherein the output unit includes a communication unit used for wireless communication of the process history data.

11. A dump truck comprising:
a vessel;
an object detection device that detects an object at a front side of the dump truck;
a collision determination unit that determines a possibility of a collision with the object based on a detection result of the object detection device;
a process system that performs a process for reducing damage caused by the collision, the process system including a plurality of process devices which are configured to perform different processes from each other for reducing the damage caused by the collision and which include an alarm device configured to perform an alarm generation process and a brake device configured to perform a brake process on a traveling device of the dump truck;

a control unit that outputs a signal for reducing the damage caused by the collision to the process system based on a determination result of the collision determination unit;

a time point data acquisition unit that acquires time point data at a time point in which the signal is output from the control unit;

a position data acquisition unit that acquires position data of the dump truck at the time point in which the signal is output from the control unit;

a loaded state data acquisition unit that acquires a loaded state data of a load of the vessel of the dump truck at the time point in which the signal is output from the control unit; and an output unit that outputs process history data indicating at least a process state of the alarm generation process and the brake process performed by the process system which is process content of the process for reducing damage caused by the collision by the process system, wherein the dump truck travels on a loading field, a soil disposal field, and a traveling road connected to the loading field and the soil disposal field in a mining site of a mine, wherein the process history data indicates any one of an existence of the process and content of the process or both the existence of the process and the content of the process, wherein the output unit outputs, to an external device, the loaded state data, the time point data, the position data, and the process history data in association with each other, wherein the control unit outputs the signal to a specific process device from the plurality of process devices based on the determination result of the collision determination unit, wherein the output unit includes a communication unit used for wireless communication with the external device.

12. A dump truck control method comprising:

detecting an object at a front side of a dump truck with a vessel by an object detection device provided in the dump truck;

determining via a collision determination unit a possibility of a collision between the transporter vehicle and the object based on a detection result of the object detection device;

outputting via a control unit a signal for reducing damage caused by the collision to a process system configured to perform a process for reducing the damage caused by the collision based on a determination result of the collision determination unit, the process system including a plurality of process devices which are configured to perform different processes from each other for reducing the damage caused by the collision and which include an alarm device configured to perform an alarm generation process and a brake device configured to perform a brake process on a traveling device of the dump truck;

acquiring via time point data acquisition unit time point data at a time point in which the signal is output from the control unit;

acquiring via a position data acquisition unit position data of the dump truck at the time point in which the signal is output from the control unit;

acquiring via a loaded state data acquisition unit a loaded state data of a load of the vessel of the dump truck at the time point in which the signal is output from the control unit; and outputting via an output device process history data indicating at least a process state of the alarm generation process and the brake process performed by the process system which is process content of the process for reducing damage caused by the collision by the process system;

wherein the dump truck travels on a loading field, a soil disposal field, and a traveling road connected to the loading field and the soil disposal field in a mining site of a mine, wherein the outputting includes outputting, to an external device via the output device, the loaded state data, the time point data, the position data, and the process history data in association with each other.

13. The dump truck control method according to claim 12, further comprising:

storing via a storage unit the position data of the dump truck and the process history data in association with each other.

14. The dump truck control method according to claim 12, further comprising:

acquiring via a vehicle identification data acquisition unit identification data of the dump truck outputting the signal from the control unit, wherein the process history data is associated with the vehicle identification data.

15. The dump truck control method according to claim 12, further comprising:

acquiring via a driver identification data acquisition unit identification data of a driver of the dump truck outputting the signal from the control unit, wherein the process history data is associated with the driver identification data.

16. The dump truck control method according to claim 12, further comprising:

acquiring via a traveling state data acquisition unit a traveling state data of the dump truck outputting the signal from the control unit, wherein the process history data is associated with the traveling state data.

17. The dump truck control method according to claim 12, wherein the control unit outputs the signal to a specific process device from the plurality of process devices based on the determination result of the collision determination unit.

18. The dump truck control method according to claim 17, wherein the determination of the collision determination unit includes a case in which the possibility of the collision is classified into a plurality of levels, and wherein the control unit outputs the signal to the specific process device based on the level.

19. The dump truck control method according to claim 17, further comprising:

performing via a power generation device of the process devices an output reduction process for reducing a driving force for the traveling device of the dump truck.

20. The dump truck control method according to claim 12, wherein the output unit includes a communication unit used for wireless communication of the process history data.

21. The dump truck control method according to claim 12, further comprising:
  storing the time point data in which the signal is output from the control unit and the process history data in association with each other.

* * * * *